US012336534B2

(12) United States Patent
Jones et al.

(10) Patent No.: US 12,336,534 B2
(45) **Date of Patent: *Jun. 24, 2025**

(54) METHODS AND COMPOSITIONS FOR CONTROLLING CORN ROOTWORM

(71) Applicant: NewLeaf Symbiotics, Inc., St. Louis, MO (US)

(72) Inventors: Marcus Jones, St. Louis, MO (US); Gregg Bogosian, St. Louis, MO (US)

(73) Assignee: NewLeaf Symbiotics, Inc., St. Louis, MO (US)

( * ) Notice: Subject to any disclaimer, the term of this patent is extended or adjusted under 35 U.S.C. 154(b) by 648 days.

This patent is subject to a terminal disclaimer.

(21) Appl. No.: 17/129,004

(22) Filed: Dec. 21, 2020

(65) Prior Publication Data

US 2021/0106010 A1 Apr. 15, 2021

Related U.S. Application Data

(63) Continuation of application No. 15/521,668, filed as application No. PCT/US2015/057521 on Oct. 27, 2015, now Pat. No. 10,905,127.

(60) Provisional application No. 62/068,926, filed on Oct. 27, 2014.

(51) Int. Cl.

| | |
|---|---|
| ***A01N 25/04*** | (2006.01) |
| ***A01N 25/00*** | (2006.01) |
| ***A01N 37/46*** | (2006.01) |
| ***A01N 63/20*** | (2020.01) |

(52) U.S. Cl.
CPC ............. *A01N 25/04* (2013.01); *A01N 25/00* (2013.01); *A01N 63/20* (2020.01)

(58) Field of Classification Search
CPC ........ A01N 25/04; A01N 25/00; A01N 63/20; A01N 25/08; A01N 37/46; A01N 51/00
See application file for complete search history.

(56) References Cited

U.S. PATENT DOCUMENTS 4,336,334 A ‡ 6/1982 Powell ...................... C12R 1/01 435/14
5,013,655 A 5/1991 Suzuki et al.
5,013,665 A ‡ 5/1991 Suzuki ..................... C12N 1/38 435/24
5,106,648 A ‡ 4/1992 Williams ............... A01N 63/00 424/93
5,112,843 A ‡ 5/1992 Bjostad, III ........... A01N 43/76 424/84
5,302,525 A ‡ 4/1994 Groleau .................. C12P 7/625 435/13
5,344,768 A ‡ 9/1994 Urakami ............... C12P 17/182 435/11
5,403,799 A ‡ 4/1995 Miller .................. B01J 35/1038 502/64
5,403,809 A ‡ 4/1995 Miller .................. B01J 37/0009 502/41
5,512,069 A ‡ 4/1996 Holland ................... A01C 1/06 424/93
5,686,276 A ‡ 11/1997 Laffend .................... C12N 9/88 435/15
5,961,687 A ‡ 10/1999 Joshi ........................ A01H 3/04 71/6
6,027,723 A ‡ 2/2000 Heins ..................... A01N 63/00 424/93
6,107,067 A ‡ 8/2000 Miller .................... C12N 11/14 435/17
6,174,837 B1 ‡ 1/2001 Joshi ....................... C05F 11/08 504/11
6,329,320 B1 ‡ 12/2001 Joshi ...................... A01N 63/00 504/11
7,214,509 B2 ‡ 5/2007 Schnoor ................... A62D 3/02 435/25
7,435,878 B2 ‡ 10/2008 Holland ................... A01C 1/00 435/24
8,181,388 B2 ‡ 5/2012 Berger ..................... A01C 1/06 47/58
9,181,541 B2 * 11/2015 Bogosian ............... A01N 63/20
9,845,462 B2 ‡ 12/2017 Bogosian ............... C12N 11/14
10,098,353 B2 ‡ 10/2018 Breakfield ............. A01N 63/00
10,111,438 B2 ‡ 10/2018 Floro ..................... A01N 63/00
10,212,939 B2 * 2/2019 Floro ..................... A01N 63/00
10,287,544 B2 ‡ 5/2019 Bogosian ............... A01N 63/00
10,368,547 B2 ‡ 8/2019 Floro ..................... A01N 25/04
10,448,645 B2 * 10/2019 Breakfield ............. A01N 63/20
10,757,946 B2 * 9/2020 Allen ....................... C12N 1/04
(Continued)

FOREIGN PATENT DOCUMENTS

CN 101028008 * 9/2007
CN 101028008 A * 9/2007
(Continued)

OTHER PUBLICATIONS

Corpe et al., "Methanol-Utilizing Bacteria Associated with Green Plants", Developments in Industrial Microbiology, 1982, pp. 483-493, vol. 23.‡
Leslie et al., "Trehalose and Sucrose Protect Both Membranes and Proteins in Intact Bacteria during Drying", Applied and Environmental Microbiology, Oct. 1995, pp. 3592-3597, vol. 61 No. 10.‡
Li et al., "2,4,5,-Trichlorophenol Degradation Using a Novel TiO2-Coated Biofilm Carrier: Roles of Adsorption, Photocatalysis, and Biodegradation", Environmental Science & Technology, Aug. 23, 2011, pp. 8359-8367. vol. 45. No. 19.‡
De Valdez et al., "Effect of Drying Medium on Residual Moisture Content and Viability of Freeze-Dried Lactic Acid Bacteria", Applied and Environmental Microbiology, Feb. 1985, pp. 413-415, vol. 49, No. 2.‡
(Continued)

*Primary Examiner* — Mina Haghighatian
(74) *Attorney, Agent, or Firm* — Stinson LLP

(57) ABSTRACT

The present disclosure provides compositions comprising Corn Rootworm (CRW)-active *Methylobacterium* sp., methods for controlling CRW, and methods of making the compositions. Also provided are isolated CRW-active *Methylobacterium* sp.

19 Claims, 5 Drawing Sheets

Specification includes a Sequence Listing.

(56) References Cited

U.S. PATENT DOCUMENTS

| | | | | |
|---|---|---|---|---|
| 10,905,127 | B2 * | 2/2021 | Jones | A01N 25/04 |
| 10,945,440 | B2 * | 3/2021 | DiDonato Floro | A01N 63/20 |
| 10,945,441 | B2 * | 3/2021 | DiDonato Floro | A01N 63/00 |
| 10,980,240 | B2 * | 4/2021 | Jones | A01N 25/00 |
| 11,278,029 | B2 * | 3/2022 | Rioux | A01N 63/20 |
| 2006/0150488 | A1 ‡ | 7/2006 | Pearce | C12N 1/20 47/57 |
| 2006/0166346 | A1 ‡ | 7/2006 | Takagi | B09C 1/002 435/25 |
| 2006/0228797 | A1 ‡ | 10/2006 | Holland | C12N 15/01 435/37 |
| 2007/0074451 | A1 ‡ | 4/2007 | Pearce | C12N 1/04 47/57 |
| 2007/0265166 | A1 ‡ | 11/2007 | Bardella | A01N 27/00 504/35 |
| 2011/0269219 | A1 ‡ | 11/2011 | Holland | C12P 39/00 435/25 |
| 2013/0254933 | A1 * | 9/2013 | Kramer | B01D 71/64 435/320.1 |
| 2013/0324407 | A1 | 12/2013 | Bogosian | |
| 2015/0337256 | A1 ‡ | 11/2015 | Bogosian | C12N 11/14 800/30 |
| 2016/0046925 | A1 ‡ | 2/2016 | Bogosian | C12N 11/02 800/30 |
| 2016/0073641 | A1 ‡ | 3/2016 | Allen | A01N 63/10 800/29 |
| 2016/0120188 | A1 ‡ | 5/2016 | Bogosian | A01N 63/00 800/29 |
| 2016/0295868 | A1 ‡ | 10/2016 | Jones | A01N 25/00 |
| 2016/0302423 | A1 ‡ | 10/2016 | Jones | A01N 63/00 |
| 2016/0302424 | A1 ‡ | 10/2016 | DiDonato | A01N 63/00 |
| 2016/0302425 | A1 ‡ | 10/2016 | DiDonato | A01N 63/00 |
| 2017/0086464 | A1 ‡ | 3/2017 | Floro | A01N 63/10 |
| 2017/0135352 | A1 ‡ | 5/2017 | Breakfield | A01N 63/00 |
| 2017/0164618 | A1 ‡ | 6/2017 | Breakfield | A01N 63/00 |
| 2017/0238553 | A1 ‡ | 8/2017 | Jones | A01N 25/00 |
| 2018/0014223 | A1 ‡ | 1/2018 | Cheng | H04L 69/22 |
| 2018/0142230 | A1 ‡ | 5/2018 | Bogosian | C12N 11/02 |
| 2018/0295841 | A1 ‡ | 10/2018 | Rioux | A01N 63/10 |
| 2019/0008159 | A1 ‡ | 1/2019 | Breakfield | A01N 63/00 |
| 2019/0021334 | A1 ‡ | 1/2019 | DiDonato Floro | A01N 63/00 |
| 2019/0116803 | A1 ‡ | 4/2019 | DiDonato Floro | A01N 63/00 |
| 2019/0297895 | A1 ‡ | 10/2019 | Floro | A01N 63/20 |
| 2019/0364905 | A1 ‡ | 12/2019 | Rioux | A01N 33/24 |
| 2019/0387747 | A1 ‡ | 12/2019 | Breakfield | A01N 63/00 |
| 2021/0186026 | A1 * | 6/2021 | DiDonato Floro | A01N 63/20 |
| 2021/0352911 | A1 * | 11/2021 | DiDonato Floro | A01N 63/20 |

FOREIGN PATENT DOCUMENTS

| | | | | |
|---|---|---|---|---|
| CN | 100479664 | C ‡ | 4/2009 | |
| EP | 0140723 | A1 ‡ | 5/1985 | C12P 7/48 |
| EP | 2390345 | A1 ‡ | 11/2011 | D21H 17/005 |
| KR | 100755509 | B1 ‡ | 9/2007 | |
| KR | 20070106867 | A ‡ | 11/2007 | |
| KR | 20070106868 | A ‡ | 11/2007 | |
| KR | 20070111915 | A ‡ | 11/2007 | |
| KR | 20080097568 | A ‡ | 11/2008 | |
| KR | 100953179 | B1 ‡ | 4/2010 | |
| KR | 10-1195899 | B1 ‡ | 10/2012 | |
| WO | WO-2003046226 | A1 ‡ | 6/2003 | |
| WO | WO-2012012671 | A2 ‡ | 1/2012 | C12P 7/16 |
| WO | WO-2013141815 | A1 ‡ | 9/2013 | C12Y 118/06001 |
| WO | WO-2014149176 | A2 ‡ | 9/2014 | A01N 63/00 |
| WO | WO-2015085115 | A1 ‡ | 6/2015 | A01N 63/00 |
| WO | WO-2016069564 | A1 ‡ | 5/2016 | A01N 25/04 |
| WO | WO-2016201284 | A2 ‡ | 12/2016 | C12N 1/20 |
| WO | WO-2018106899 | A1 ‡ | 6/2018 | A01N 37/18 |

OTHER PUBLICATIONS

Lidstrom et al., “Plants in the Pink: Cytokinin Production by Methylbacterium”, Journal of Bacteriology, Apr. 2002, p. 1818, vol. 184, No. 7.‡

Donlan et al., “Biofilms: Survival Mechanisms of Clinically Relevant Microorganisms”, Clinical Microbiology Reviews, Apr. 2002, pp. 167-193, vol. 15, No. 2.‡

Lodato et al., “Viability and thermal stability of a strain of *Saccharomyces cerevisiae* freeze-dried in different sugar and polymer matrices”, Appl Microbiol Biotechnol, 1999, pp. 215-220, vol. 52.‡

Chitra et al., “Multigeneric Microbial Coaggregates-Effect of Different Bioformulations of PGPR Cells on the Enhancement of PGPR Characteristics and Biocontrol Against Xanthomonas oryzae pv. oryzae in Rice Grown Under Lowland Condition”, Journal of Applicable Chemistry, 2013, pp. 1132-1140, vol. 2, No. 5.‡

Mackinnon et al., “Kaolinite Particle Sizes in the <2 mM Range Using Laser Scattering”, Clays and Clay Minerals, 1993, pp. 613-623, vol. 41 No. 5.‡

Corpe et al., “Ecology of the Methylotrophic Bacteria on Living Leaf Surfaces”, FEMS Microbiology Ecology, 1989, pp. 243-250, vol. 62.‡

Joe et al., Development of Alginate-Based Aggregate Inoculants of *Methylobacterium* sp. and Azospirillum Brasilense Tested Under in vitro Conditions to Promote Plant Growth, Journal of Applied Microbiology, Nov. 2012, pp. 1-46.‡

Gomathy et al., “Impact of Biofertigation of Azophosmet on Cotton Yield under Dripirrigation”, Research Journal of Agriculture and Biological Sciences, 2008, pp. 695-699, vol. 4, No. 6.‡

Kongkhaem et al., “Silica-Immobilized *Methylobacterium* sp. NP3 and *Acinetobacter* sp. PK1 Degrade High Concentrations of Phenol”, Letters in Applied Microbiology, May 2011, pp. 448-455, vol. 52 No. 5.‡

Green, “Methylobacterium”, In: Prokaryotes, 2006, pp. 257-265, vol. 5.‡

International Search Report and Written Opinion for PCT/US2015/057521 issued Feb. 16, 2016.‡

Holland, “Methylobacterium and Plants”, Recent Research Developments in Plant Physiology, 1997, pp. 207-213, vol. 1.‡

Jiang et al., “Methanotrophs: Multifunctional Bacteria with Promising Applications in Environmental Bioengineering”, Biochemical Engineering Journal, May 15, 2010, pp. 277-288, vol. 49 No. 3.‡

Franzetti et al., “Surface-Active Compounds and Their Role in the Access to Hydrocarbons in Gordonia Strains”, Federation of European Microbiological Societies, 2008, pp. 238-248, vol. 63.‡

GenBank entry FP103042, Nov. 5, 2010, retreived on Jan. 5, 2016 from http://www.ncbi.nlm.nih.gov/nuccore/254265931?sat=18&satkey-27964264.‡

Vaidehi et al., “Adhesion of Methylobacterium Cells to Rice Roots: Active Metabolism of Miropartner Determines the Degree of Adsorption Level at Rhizosphere”, International Journal of Research in Pure and Applied Microbiology, 2012, pp. 54-58, vol. 2, No. 4.‡

Verhoef et al., “*Methylobacterium* sp. Isolated from a Finnish Paper Machine Produces Highly Pyruvated Galactan Exopolysaccharide”, Carbohydrate Research, 2003, pp. 1851-1859, vol. 338.‡

Vuilleumier et al., “Methylobacterium Genome Sequences: A Reference Blueprint to Investigate Microbial Metabolism of C1 Compounds from Natural and Industrial Sources”, Public Library of Science One, May 18, 2009, pp. 1-16; vol. 4, No. 5.‡

Welch et al., “A Method for Quantitative Determination of Biofilm Viability”, Journal of Functional Biomaterials, 2012, pp. 418-431, vol. 3.‡

Wessman et al., “Impact of Matrix Properties on the Survival of Freeze-Dried Bacteria”, Journal of the Science of Food and Agriculture, 2011, pp. 2518-2528, vol. 91.‡

Omer et al., “Plant Colonization by Pink-Pigmented Facultative Methylotrophic Bacteria (PPFMs)”, FEMS Microbiology Ecology, Mar. 2004, pp. 319-326, vol. 47 No. 3.‡

Simoes et al., “Adhesion and Biofilm Formation on Polystyrene by Drinking Water-Isolated Bacteria”, Antonie van Leeuwenhoek, Apr. 20, 2010, pp. 317-329, vol. 98 No. 3.‡

Sundaram et al., “Bioinoculants for Sustainable and Cost Effective Production of High Quality Fibre”, TMC Annual Report, TMC-MMI-2.3, 2006, pp. 1-7, Retrieved from the internet, Apr. 2, 2014, http://www.tmc.cicr.org.in/PDF/22.3.pdf.‡

(56) References Cited

OTHER PUBLICATIONS

Madhaiyan et al., "Pink-Pigmented Facultative Methylotrophic Bacteria Accelerate Germination, Growth and Yield of Sugarcane Clone Co86032 (*Saccharum officinarum* L.)", Biology of Fertile Soils, 2005, pp. 350-358, vol. 41.‡

Ntsaluba et al., "Studies on Bioflocculant Production by *Methylobacterium* sp. Obi Isolated from a Freshwater Environment in South Africa", African Journal of Microbiology Research, Nov. 16, 2011, pp. 4533-4540, vol. 5 No. 26.‡

Abanda-Nkpwatt et al., "Molecular Interaction Between Methylobacterium Extorquens and Seedlings: Growth Promotion, Methanol Consumption, and Localization of the Methanol Emission Site", Journal of Experimental Botany, Oct. 16, 2006, pp. 4025-4032, vol. 57 No. 15.‡

Adams, "The Principles of Freeze-Drying", Methods in Molecular Biology, 2007, pp. 15-38, vol. 368.‡

Balachandar et al., "Genetic and Metabolic Diversity of Pink-Pigmented Facultative Methylotrophs in Phyllosphere of Tropical Plants", Brazilian Journal of Microbiology, 2008, pp. 68-73, vol. 39.‡

Bardi et al., "Immobilization of Yeast on Delignified Cellulosic Material for Low Temperature Brewing", Journal of Agricultural and Food Chemistry, 1996, pp. 463-467, vol. 44 No. 2.‡

Chitra et al., "Multigeneric PGPR Coaggregates: A Novel Bioformulation and Delivery System for the Induction of Systemic Resistance in Rice-Xanthomonas Oryzae Pathosystem Under Lowland Condition", Golden Research Thoughts, Oct. 2013, pp. 1-10, vol. 3, No. 4.‡

"Bacteria Lyophilization Overview", OPS Diagnostics, 3 pages, http://opsdiagnostics.com/notes/ranpri/bacteria_lyophilization_overview.htm.‡

"Tips and Techniques for Culturing Bacteria and Bacteriophages", ATCC Bacterial Culture Guide, 2012, pp. 21-24.‡

"A Guide to Freeze Drying for the Laboratory", Labconco Corporation, 2004, pp. 1-12.‡

"Bacteria Freeze Drying Protocol", OPS Diagnostics, 4 pages, http://www.opsdiagnostics.com/notes/ranpri/rpbacteriafdprotocol.htm.‡

Vuilleumier1, et al., "Methylobacterium Genome Sequences: A Reference Blueprint to Investigate Microbial Metabolism of C1 Compounds from Natural and Industrial Sources," PLOS One, vol. 4(5), May 2009, e5584, pp. 1-16.‡

Tinsley, et al., "Validation of a nested error component model to estimate damage caused by corn rootworm larvae", Journal of Applied Entomology, May 30, 2012, DOI: 10.1111/j.1439-0418.2012.01736.x.‡

USDA "Field Crops Usual Planting and Harvesting Dates", Oct. 2010, Agricultural Handbook No. 628, 51 pages.‡

GIEWS Country Brief China (Mainland), Food and Agriculture Organization of the United States, Jun. 12, 2019 reference date, 3 pages.‡

Han, et al., "ANItools web: a web tool for fast genome comparison within multiple bacterial strains", Database (Oxford). Jun. 5, 2016;2016, pp. 1-5.‡

Jain, et al., a"High throughput ANI analysis of 90K prokaryotic genomes reveals clear species boundaries", Nat Commun 9, 5114 (2018), https://doi.org/10.1038/s41467-018-07641-9.‡

Green, et al., "Review of the genus *Methylobacterium* and closely related organisms: a proposal that some *Methylobacterium* species be reclassified into a new genus, *Methylorubrum* gen. nov.", Int. J Syst Evol Microbiol 2018; 68:2727-2748; DOI: 10.1099/ijsem.0.002856.‡

Tani et al., "*Methylobacterium* Species Promoting Rice and Barley Growth and Interaction Specificity Revealed with Whole-Cell Matrix-Assisted Laser Desorption/Ionization-Time-of-Flight Mass Spectrometry (MALDI-TOF/MS) Analysis", PLOS One, Jun. 8, 2015, pp. 1-15.‡

Vuilleumier et al., "Methylobacterium Genome Sequences: A Reference Blueprint to Investigate Microbial Metabolism of C1 Compounds from Natural and Industrial Sources," PLoS One, 4(5):e5584, pp. 1-16, May 2009.

International Search Report and Written Opinion of the ISA/US in PCT/US2015/057521, dated Feb. 16, 2016, 15pgs.

* cited by examiner
‡ imported from a related application

Untreated Check-

Treated with CRW-active PPFM isolate at V3

Untreated Check-

Treated with CRW-active PPFM isolate at V3

SEQUENCE LISTING

```
<160> NUMBER OF SEQ ID NOS: 5

<210> SEQ ID NO 1
<211> LENGTH: 1471
<212> TYPE: DNA
<213> ORGANISM: Methylobacterium sp.

<400> SEQUENCE: 1

gagtttgatc ctggctcaga gcgaacgctg gcggcaggct taacacatgc aagtcgagcg      60

ggcctttcgg ggtcagcggc ggacgggtga gtaacgcgtg ggaacgtgcc ttctggttcg     120

gaataaccct gggaaactag ggctaatacc ggatacgccc ttttggggaa aggtttactg     180

ccggaagatc ggcccgcgtc tgattagcta gttggtgggg taacggccta ccaaggcgac     240

gatcagtagc tggtctgaga ggatgatcag ccacactggg actgagacac ggcccagact     300

cctacgggag gcagcagtgg ggaatattgg acaatgggcg caagcctgat ccagccatgc     360

cgcgtgagtg atgaaggcct tagggttgta aagctctttt atccgggacg ataatgacgg     420

taccggagga ataagccccg gctaacttcg tgccagcagc cgcggtaata cgaagggggc     480

tagcgttgct cggaatcact gggcgtaaag ggcgcgtagg cggcgtttta agtcgggggt     540

gaaagcctgt ggctcaacca cagaatggcc ttcgatactg ggacgcttga gtatggtaga     600

ggttggtgga actgcgagtg tagaggtgaa attcgtagat attcgcaaga acaccggtgg     660

cgaaggcggc caactggacc attactgacg ctgaggcgcg aaagcgtggg gagcaaacag     720

gattagatac cctggtagtc cacgccgtaa acgatgaatg ccagctgttg gggtgcttgc     780

accgcagtag cgcagctaac gctttgagca ttccgcctgg ggagtacggt cgcaagatta     840

aaactcaaag gaattgacgg gggcccgcac aagcggtgga gcatgtggtt taattcgaag     900

caacgcgcag aaccttacca tcctttgaca tggcgtgtta cccagagaga tttggggtcc     960

acttcggtgg cgcgcacaca ggtgctgcat ggctgtcgtc agctcgtgtc gtgagatgtt    1020

gggttaagtc ccgcaacgag cgcaacccac gtccttagtt gccatcattc agttgggcac    1080

tctagggaga ctgccggtga taagccgcga ggaaggtgtg gatgacgtca agtcctcatg    1140

gcccttacgg gatgggctac acacgtgcta caatggcggt gacagtggga ggcgaaggag    1200

cgatctggag caaatcccca aaagccgtct cagttcggat tgcactctgc aactcgagtg    1260

catgaaggcg gaatcgctag taatcgtgga tcagcatgcc acggtgaata cgttcccggg    1320

ccttgtacac accgcccgtc acaccatggg agttggtctt acccgacggc gctgcgccaa    1380

ccgcaaggag gcaggcgacc acggtagggt cagcgactgg ggtgaagtcg taacaaggta    1440

gccgtagggg aacctgcggc tggatcacct c                                   1471

<210> SEQ ID NO 2
<211> LENGTH: 1471
<212> TYPE: DNA
<213> ORGANISM: Methylobacterium sp.

<400> SEQUENCE: 2

ggtgatccag ccgcaggttc ccctacggct accttgttac gacttcaccc cagtcgctga      60

ccctaccgtg gtcgcctgcc tccttgcggt tggcgcagcg ccgtcgggta agaccaactc     120
```

```
ccatggtgtg acgggcggtg tgtacaaggc ccgggaacgt attcaccgtg gcatgctgat    180
ccacgattac tagcgattcc gccttcatgc actcgagttg cagagtgcaa tccgaactga    240
gacggctttt ggggatttgc tccagatcgc tccttcgcgt cccactgtca ccgccattgt    300
agcacgtgtg tagcccatcc cgtaagggcc atgaggactt gacgtcatcc acaccttcct    360
cgcggcttat caccggcagt ctccctagag tgcccaactg aatgatggca actaaggacg    420
tgggttgcgc tcgttgcggg acttaaccca acatctcacg acacgagctg acgacagcca    480
tgcagcacct gtgtgcgcgc caccgaagtg gaccccaaat ctctctgggt aacacgccat    540
gtcaaaggat ggtaaggttc tgcgcgttgc ttcgaattaa accacatgct ccaccgcttg    600
tgcgggcccc cgtcaattcc tttgagtttt aatcttgcga ccgtactccc caggcggaat    660
gctcaaagcg ttagctgcgc tactgcggtg caagcacccc aacagctggc attcatcgtt    720
tacggcgtgg actaccaggg tatctaatcc tgtttgctcc ccacgctttc gcgcctcagc    780
gtcagtaatg gtccagttgg ccgccttcgc caccggtgtt cttgcgaata tctacgaatt    840
tcacctctac actcgcagtt ccaccaacct ctaccatact caagcgtccc agtatcgaag    900
gccattctgt ggttgagcca caggctttca cccccgactt aaaacgccgc ctacgcgccc    960
tttacgccca gtgattccga gcaacgctag ccccccttcgt attaccgcgg ctgctggcac   1020
gaagttagcc ggggcttatt cctccggtac cgtcattatc gtcccggata aaagagcttt   1080
acaaccctaa ggccttcatc actcacgcgg catggctgga tcaggcttgc gcccattgtc   1140
caatattccc cactgctgcc tcccgtagga gtctgggccg tgtctcagtc ccagtgtggc   1200
tgatcatcct ctcagaccag ctactgatcg tcgccttggt aggccgttac cccaccaact   1260
agctaatcag acgcgggccg atcttccggc agtaaacctt tccccaaaag ggcgtatccg   1320
gtattagccc tagtttccca gggttattcc gaaccagaag gcacgttccc acgcgttact   1380
cacccgtccg ccgctgaccc cgaagggccc gctcgacttg catgtgttaa gcctgccgcc   1440
agcgttcgct ctgagccagg atcaaactct c                                  1471
```

<210> SEQ ID NO 3
<211> LENGTH: 1473
<212> TYPE: DNA
<213> ORGANISM: Methylobacterium sp.

<400> SEQUENCE: 3

```
gagtttgatc ctggctcaga gcgaacgctg gcggcaggct taacacatgc aagtcgaacg     60
ggcaccttcg ggtgtcagtg gcagacgggt gagtaacacg tgggaacgta cccttcggtt    120
cggaataact cagggaaact tgagctaata ccggatacgc ccttttgggg aaaggtttac    180
tgccgaagga tcggcccgcg tctgattagc ttgttggtgg ggtaacggcc taccaaggcg    240
acgatcagta gctggtctga gaggatgatc agccacactg ggactgagac acggcccaga    300
ctcctacggg aggcagcagt ggggaatatt ggacaatggg cgcaagcctg atccagccat    360
gccgcgtgag tgatgaaggc cttagggttg taaagctctt ttgtccggga cgataatgac    420
ggtaccggaa gaataagccc cggctaactt cgtgccagca gccgcggtaa tacgaagggg    480
gctagcgttg ctcggaatca ctgggcgtaa agggcgcgta ggcggccgat taagtcgggg    540
gtgaaagcct gtggctcaac cacagaattg ccttcgatac tggttggctt gagaccggaa    600
gaggacagcg gaactgcgag tgtagaggtg aaattcgtag atattcgcaa gaacaccagt    660
ggcgaaggcg gctgtctggt ccggttctga cgctgaggcg cgaaagcgtg ggagcaaac     720
```

```
aggattagat accctggtag tccacgccgt aaacgatgaa tgccagccgt tggcctgctt    780

gcaggtcagt ggcgccgcta acgcattaag cattccgcct ggggagtacg gtcgcaagat    840

taaaactcaa aggaattgac gggggcccgc acaagcggtg gagcatgtgg tttaattcga    900

agcaacgcgc agaaccttac catcccttga catggcatgt tacctcgaga gatcggggat    960

cctcttcgga ggcgtgcaca caggtgctgc atggctgtcg tcagctcgtg tcgtgagatg   1020

ttgggttaag tcccgcaacg agcgcaaccc acgtccttag ttgccatcat tcagttgggc   1080

actctaggga gactgccggt gataagccgc gaggaaggtg tggatgacgt caagtcctca   1140

tggcccttac gggatgggct acacacgtgc tacaatggcg gtgacagtgg gacgcgaagc   1200

cgcgaggtgg agcaaatccc caaaaaccgt ctcagttcgg attgcactct gcaactcggg   1260

tgcatgaagg cggaatcgct agtaatcgtg gatcagcacg ccacggtgaa tacgttcccg   1320

ggccttgtac acaccgcccg tcacaccatg ggagttggtc ttacccgacg gcgctgcgcc   1380

aaccgcaagg aggcaggcga ccacggtagg gtcagcgact ggggtgaagt cgtaacaagg   1440

tagccgtagg ggaacctgcg gctggatcac ctc                                1473
```

```
<210> SEQ ID NO 4
<211> LENGTH: 1484
<212> TYPE: DNA
<213> ORGANISM: Methylobacterium sp.

<400> SEQUENCE: 4

gagtttgatc ctggctcaga gcgaacgctg gcggcaggct taacacatgc aagtcgaacg     60

caccgcaagg tgagtggcag acgggtgagt aacacgtggg aacgtgccct ccggtctggg    120

ataaccctgg gaaactaggg ctaataccgg atacgtgctt tggcagaaag gtttactgcc    180

ggaggatcgg cccgcgtctg attagcttgt tggtggggta acggcctacc aaggcgacga    240

tcagtagctg gtctgagagg atgatcagcc acactgggac tgagacacgg cccagactcc    300

tacgggaggc agcagtgggg aatattggac aatgggcgca agcctgatcc agccatgccg    360

cgtgagtgat gacggcctta gggttgtaaa gctcttttct ccgggacgat aatgacggta    420

ccggaggaat aagccccggc taacttcgtg ccagcagccg cggtaatacg aaggggggcta   480

gcgttgctcg gaatcactgg gcgtaaaggg cgcgtaggcg gcgttttaag tcgggggtga    540

aagcctgtgg ctcaaccaca gaatggcctt cgatactggg acgcttgagt atggtagagg    600

ttggtggaac tgcgagtgta gaggtgaaat tcgtagatat tcgcaagaac accggtggcg    660

aaggcggcca actggaccat tactgacgct gaggcgcgaa agcgtgggga gcaaacagga    720

ttagataccc tggtagtcca cgccgtaaac gatgaatgct agctgttggg gtgcatgcac    780

cgcagtagcg cagctaacgc attaagcatt ccgcctgggg agtacggtcg caagattaaa    840

actcaaagga attgacgggg gcccgcacaa gcggtggagc atgtggttta attcgaagca    900

acgcgcagaa ccttaccatc ctttgacatg gcgtgttact gggagagatt ccaggtcccc    960

ttcgggggcg cgcacacagg tgctgcatgg ctgtcgtcag ctcgtgtcgt gagatgttgg   1020

gttaagtccc gcaacgagcg caacccacgt ccttagttgc catcatttgg ttgggcactc   1080

tagggagact gccggtgata agccgcgagg aaggtgtgga tgacgtcaag tcctcatggc   1140

ccttacggga tgggctacac acgtgctaca atggcggtga cagtgggacg cgaaggggtg   1200

acccggagcc aatctccaaa agccgtctca gttcggattg cacgctgcaa ctcgcgtgca   1260

tgaaggcgga atcgctagta atcgtggatc agcatgccac ggtgaatacg ttcccgggcc   1320

ttgtacacac cgcccgtcac accatgggag ttggtcttac ccgacggcgc tgcgccaacc   1380
```

-continued

```
aaatcgagct tgctcgactg gaggcaggcg accacggtag ggtcagcgac tggggtgaag   1440

tcgtaacaag gtagccgtag gggaacctgc ggctggatca cctc                    1484


<210> SEQ ID NO 5
<211> LENGTH: 1471
<212> TYPE: DNA
<213> ORGANISM: Methylobacterium sp.

<400> SEQUENCE: 5

ggtgatccag ccgcaggttc ccctacggct accttgttac gacttcaccc cagtcgctga     60

ccctaccgtg gtcgcctgcc tccttgcggt tggcgcagcg ccgtcgggta agaccaactc    120

ccatggtgtg acgggcggtg tgtacaaggc ccgggaacgt attcaccgtg gcgtgctgat    180

ccacgattac tagcgattcc gccttcatgc acccgagttg cagagtgcaa tccgaactga    240

gacggctttt ggggatttgc tcaacctcgc ggtttcgcgt cccactgtca ccgccattgt    300

agcacgtgtg tagcccatcc cgtaagggcc atgaggactt gacgtcatcc acaccttcct    360

cgcggcttat caccggcagt ctccctagag tgcccaactg aatgatggca actaaggacg    420

tgggttgcgc tcgttgcggg acttaaccca acatctcacg acacgagctg acgacagcca    480

tgcagcacct gtgtgcacgc ctccgaagag gatccccgat ctctcgaggt aacatgccat    540

gtcaagggat ggtaaggttc tgcgcgttgc ttcgaattaa accacatgct ccaccgcttg    600

tgcgggcccc cgtcaattcc tttgagtttt aatcttgcga ccgtactccc caggcggaat    660

gcttaatgcg ttagcggcgc cactgacctg caagcagacc aacggctggc attcatcgtt    720

tacggcgtgg actaccaggg tatctaatcc tgtttgctcc ccacgctttc gcgcctcagc    780

gtcagaaccg gaccagacag ccgccttcgc cactggtgtt cttgcgaata tctacgaatt    840

tcacctctac actcgcagtt ccgctgtcct cttccggtct caagccaacc agtatcgaag    900

gcaattctgt ggttgagcca caggctttca cccccgactt aatcggccgc ctacgcgccc    960

tttacgccca gtgattccga gcaacgctag ccccccttcgt attaccgcgg ctgctggcac  1020

gaagttagcc ggggcttatt cttccggtac cgtcattatc gtcccggaca aaagagcttt   1080

acaaccctaa ggccttcatc actcacgcgg catggctgga tcaggcttgc gcccattgtc   1140

caatattccc cactgctgcc tcccgtagga gtctgggccg tgtctcagtc ccagtgtggc   1200

tgatcatcct ctcagaccag ctactgatcg tcgccttggt aggccgttac cccaccaaca   1260

agctaatcag acgcgggccg atccttcggc agtaaacctt tccccaaaag ggcgtatccg   1320

gtattagctc aagtttccct gagttattcc gaaccgaagg gcacgttccc acgtgttact   1380

cacccgtctg ccgctgacac cgaagtgccc gctcgacttg catgtgttaa gcctgccgcc   1440

agcgttcgct ctgagccagg atcaaactct c                                  1471
```

METHODS AND COMPOSITIONS FOR CONTROLLING CORN ROOTWORM

CROSS-REFERENCE TO RELATED APPLICATIONS

This US non-provisional patent application is a continuation of US National Phase Patent application Ser. No. 15/521,668, filed Apr. 25, 2017, which is the national stage of International Patent Application No. PCT/US2015/057521, filed Oct. 27, 2015, which claims the benefit of U.S. Provisional Patent Application No. 62/068,926, filed Oct. 27, 2014, which is incorporated herein by reference in their entireties.

SEQUENCE LISTING STATEMENT

A sequence listing containing the file named 53907_204718_SEQLST_ST25.txt which is 10,501 bytes (measured in MS-Windows®) and created on Dec. 20, 2020, contains 5 sequences, is provided herewith via the USPTO's EFS system, and is incorporated herein by reference in its entirety.

BACKGROUND

One-carbon organic compounds such as methane and methanol are found extensively in nature, and are utilized as carbon sources by bacteria classified as methanotrophs and methylotrophs. Methanotrophic bacteria include species in the genera *Methylobacter, Methylomonas, Methylomicrobium, Methylococcus, Methylosinus, Methylocystis, Methylosphaera, Methylocaldum*, and *Methylocella* (Lidstrom, 2006). Methanotrophs possess the enzyme methane monooxygenase, that incorporates an atom of oxygen from $O_2$ into methane, forming methanol. All methanotrophs are obligate one-carbon utilizers that are unable to use compounds containing carbon-carbon bonds. Methylotrophs, on the other hand, can also utilize more complex organic compounds, such as organic acids, higher alcohols, sugars, and the like. Thus, methylotrophic bacteria are facultative methylotrophs. Methylotrophic bacteria include species in the genera *Methylobacterium, Hyphomicrobium, Methylophilus, Methylobacillus, Methylophaga, Aminobacter, Methylorhabdus, Methylopila, Methylosulfonomonas, Marinosulfonomonas, Paracoccus, Xanthobacter, Ancylobacter* (also known as *Microcyclus*), *Thiobacillus, Rhodopseudomonas, Rhodobacter, Acetobacter, Bacillus, Mycobacterium, Arthobacter*, and *Nocardia* (Lidstrom, 2006).

Most methylotrophic bacteria of the genus *Methylobacterium* are pink-pigmented. They are conventionally referred to as PPFM bacteria, being pink-pigmented facultative methylotrophs. Green (2005, 2006) identified twelve validated species in the genus *Methylobacterium*, specifically *M. aminovorans, M. chloromethanicum, M. dichloromethanicum, M. extorquens, M. fujisawaense, M. mesophilicum, M. organophilum, M. radiotolerans, M. rhodesianum, M. rhodinum, M. thiocyanatum*, and *M. zatmanii*. However, *M. nidulans* is a nitrogen-fixing *Methylobacterium* that is not a PPFM (Sy et al., 2001). *Methylobacterium* are ubiquitous in nature, being found in soil, dust, fresh water, sediments, and leaf surfaces, as well as in industrial and clinical environments (Green, 2006).

SUMMARY

Provided herein are isolated CRW-active *Methylobacterium* sp., compositions comprising CRW-active *Methylobacterium* sp., methods of using the compositions to control CRW damage to plants, plant parts, and plants derived therefrom, and methods of making the compositions. Such CRW-active *Methylobacterium* sp. are in certain instances referred to herein as simply "*Methylobacterium*" or as "PPFM" (pink-pigmented facultative methylotrophs). In certain embodiments, the CRW-active *Methylobacterium* sp. is a *Methylobacterium* isolate selected from the group consisting of ISO01, ISO02, ISO03, ISO04, and ISO07. In certain embodiments, the CRW-active *Methylobacterium* sp. is ISO02 or ISO04.

Methods for controlling corn rootworm (CRW) damage to a corn plant that comprise: (i) applying a composition comprising a CRW-active *Methylobacterium* sp. to a corn plant, a part thereof, or a corn seed; and, (ii) growing the corn plant or a corn plant from the corn seed in the presence of CRW, thereby controlling CRW damage to the corn plant or to the corn plant from the corn seed are provided herein. In certain embodiments of the methods, CRW damage sustained by any of the corn plants grown in the presence of the CRW is reduced in comparison to CRW damage sustained by a control corn plant grown in the presence of the CRW. In certain embodiments of the methods, the composition comprises a solid substance with adherent CRW-active *Methylobacterium* grown thereon or an emulsion having CRW-active *Methylobacterium* grown therein. In certain embodiments of the methods, the composition comprises the CRW-active *Methylobacterium* sp. at a titer of about $5\times10^8$, $1\times10^9$, or $1\times10^{10}$ colony-forming units per gram (CFU/gm) of the solid substance to about $5\times10^{13}$ colony-forming units of *Methylobacterium* per gram of the solid substance or at a titer of about $1\times10^6$ CFU/mL to about $1\times10^9$ CFU/mL for the emulsion. In certain embodiments, about $1\times10^2$, $1\times10^3$, or $1\times10^4$ CFU to about $1\times10^8$ or $1\times10^9$ CFU of the CRW-active *Methylobacterium* sp. are provided on a 100 $mm^2$ surface of a corn plant part. In certain embodiments, about $1\times10^2$, $1\times10^3$, or $1\times10^4$ CFU to about $1\times10^8$ or $1\times10^9$ CFU of the CRW-active *Methylobacterium* sp. are provided on the surface of a corn seed. In certain embodiments of the methods, the CRW-active *Methylobacterium* sp. is selected from the group consisting of ISO01, ISO02, ISO03, ISO04, and ISO07. In certain embodiments of any of the aforementioned methods, the applied composition coats or partially coats the corn plant, the part thereof, or the corn seed. In certain embodiments of the methods, the composition is applied to foliage of the corn plant. In certain embodiments of the aforementioned methods, the composition is applied to the corn seed. In certain embodiments of the methods, the composition is applied to the corn plant at about a vegetative emergence (VE), vegetative 1 (V1), vegetative 2 (V2), vegetative 3 (V3), vegetative 4 (V4), vegetative 5 (V5), or vegetative 6 (V6) stage. In certain embodiments of any of the aforementioned methods, the composition further comprises an insecticide that provides for inhibition of CRW growth and/or reductions in CRW-mediated plant damage. In certain embodiments where the composition further comprises an insecticide, the insecticide is selected from the group consisting of a pyrethrin, synthetic pyrethroid, oxadiazine, chloronicotinyl, neonicotinoid, nitroguanidine insecticide, triazole, organophosphate, pyrrol, pyrazole, diacylhydrazine, biological/fermentation product, and a carbamate.

Also provided are corn plants or corn plant part that is coated or partially coated with a composition comprising a CRW-active *Methylobacterium* sp. In certain embodiments, the corn plant or corn plant part is coated or partially coated with a composition that comprises a solid substance with adherent CRW-active *Methylobacterium* grown thereon or an emulsion comprising CRW-active *Methylobacterium* grown therein. In certain embodiments, the corn plant or corn plant part is coated or partially coated with a composition that comprises the CRW-active *Methylobacterium* sp. at a titer of about $5\times10^8$, $1\times10^9$, or $1\times10^{10}$ colony-forming units per gram of the solid substance to about $5\times10^{13}$ colony-forming units of *Methylobacterium* per gram of the solid substance or at a titer of about $1\times10^6$ CFU/mL to about $1\times10^9$ CFU/mL for the emulsion. In certain embodiments, about $1\times10^2$, $1\times10^3$, or $1\times10^4$ CFU to about $1\times10^8$ or $1\times10^9$ CFU of the CRW-active *Methylobacterium* sp. are provided on a 100 $mm^2$ surface of a corn plant part. In certain embodiments, about $1\times10^2$, $1\times10^3$, or $1\times10^4$ CFU to about $1\times10^8$ or $1\times10^9$ CFU of the CRW-active *Methylobacterium* sp. are provided on the surface of a corn seed. In certain embodiments, the CRW-active *Methylobacterium* sp. is a *Methylobacterium* isolate selected from the group consisting of ISO01, ISO02, ISO03, ISO04, and ISO07. In certain embodiments of any of the aforementioned corn plant parts, the corn plant part is selected from the group consisting of a coleoptile, leaf, a stalk, and a seed.

Also provided are methods for controlling corn rootworm (CRW) damage to a corn plant that comprise: (i) applying a composition comprising a CRW-active *Methylobacterium* sp. to soil where a corn plant is growing or will be grown, wherein the composition comprises a solid substance with adherent CRW-active *Methylobacterium* grown thereon or an emulsion having CRW-active *Methylobacterium* grown therein; and, (ii) growing a corn plant or a corn plant from corn seed in soil subjected to the application of the composition and in the presence of CRW. In certain embodiments of the methods, CRW damage sustained by the corn plant grown in the presence of the CRW is reduced in comparison to a control plant grown in the presence of the CRW. In certain embodiments of the methods, the composition comprises the CRW-active *Methylobacterium* sp. at a titer of about $5\times10^8$, $1\times10^9$, or $1\times10^{10}$ colony-forming units per gram of the solid substance to about $5\times10^{13}$ colony-forming units of *Methylobacterium* per gram of the solid substance or at a titer of about $1\times10^6$ CFU/mL to about $1\times10^9$ CFU/mL for the emulsion. In certain embodiments, about $1\times10^2$, $1\times10^3$, or $1\times10^4$ CFU to about $1\times10^8$ or $1\times10^9$ CFU of the CRW-active *Methylobacterium* sp. are provided on a 100 $mm^2$ surface of a corn plant part. In certain embodiments, about $1\times10^2$, $1\times10^3$, or $1\times10^4$ CFU to about $1\times10^8$ or $1\times10^9$ CFU of the CRW-active *Methylobacterium* sp. are provided on the surface of a corn seed. In certain embodiments of the methods, the CRW-active *Methylobacterium* sp. is a *Methylobacterium* isolate selected from the group consisting of ISO01, ISO02, ISO03, ISO04, and ISO07. In certain embodiments of any of the aforementioned methods, the composition is applied to the soil by broadcasting the composition, by drenching the soil with the composition, and/or by depositing the composition in furrow. In certain embodiments of the methods, the depositing in furrow is performed prior to placing corn seed in the furrow, at the same time as placing corn seed in the furrow, or after placing corn seed in the furrow. In certain embodiments of any of the aforementioned methods, the composition further comprises an insecticide that provides for inhibition of CRW growth and/or reductions in CRW-mediated plant damage. In certain embodiments where the composition further comprises an insecticide, the insecticide is selected from the group consisting of a pyrethrin, synthetic pyrethroid, oxadiazine, chloronicotinyl, neonicotinoid, nitroguanidine insecticide, triazole, organophosphate, pyrrol, pyrazole, diacylhydrazine, biological/fermentation product, and a carbamate.

Methods for treating a corn plant seed that can provide a corn rootworm (CRW) tolerant corn plant that comprises applying a composition comprising a CRW-active *Methylobacterium* sp. to a corn seed, thereby obtaining a treated seed that can provide a CRW tolerant corn plant are also provided. In certain embodiments of the methods, CRW damage sustained by the CRW tolerant corn plant grown from the treated seed and in the presence of the CRW is reduced in comparison to CRW damage sustained by a control corn plant grown from an untreated seed in the presence of CRW. In certain embodiments of the methods, the composition comprises a solid substance with adherent CRW-active *Methylobacterium* grown thereon or an emulsion having CRW-active *Methylobacterium* grown therein. In certain embodiments of the methods, the composition comprises the CRW-active *Methylobacterium* sp. at a titer of about $5\times10^8$, $1\times10^9$, or $1\times10^{10}$ colony-forming units per gram of the solid substance to about $5\times10^{13}$ colony-forming units of *Methylobacterium* per gram of the solid substance or at a titer of about $1\times10^6$ CFU/mL to about $1\times10^9$ CFU/mL for the emulsion. In certain embodiments, about $1\times10^2$, $1\times10^3$, or $1\times10^4$ CFU to about $1\times10^8$ or $1\times10^9$ CFU of the CRW-active *Methylobacterium* sp. are provided on a 100 $mm^2$ surface of a corn plant part. In certain embodiments, about $1\times10^2$, $1\times10^3$, or $1\times10^4$ CFU to about $1\times10^8$ or $1\times10^9$ CFU of the CRW-active *Methylobacterium* sp. are provided on the surface of a corn seed. In certain embodiments of the methods, the CRW-active *Methylobacterium* sp. is a *Methylobacterium* isolate selected from the group consisting of ISO01, ISO02, ISO03, ISO04, and ISO07. In certain embodiments of any of the aforementioned methods, the applied composition coats or partially coats the corn seed. Also provided herein are treated corn seeds obtained by any of the aforementioned methods. In certain embodiments of any of the aforementioned methods, the composition further comprises an insecticide that provides for inhibition of CRW growth and/or reductions in CRW-mediated plant damage. In certain embodiments where the composition further comprises an insecticide, the insecticide is selected from the group consisting of a pyrethrin, synthetic pyrethroid, oxadiazine, chloronicotinyl, neonicotinoid, nitroguanidine insecticide, triazole, organophosphate, pyrrol, pyrazole, diacylhydrazine, biological/fermentation product, and a carbamate.

Also provided herein are methods for controlling corn rootworm (CRW) damage to a corn plant that comprise: (i) planting a corn seed that has been treated with a composition comprising a CRW-active *Methylobacterium* sp.; and, (ii) growing a CRW-tolerant corn plant from the treated corn seed in the presence of CRW. In certain embodiments of the methods, the CRW damage sustained by the CRW-tolerant corn plant grown in the presence of the CRW is reduced in comparison to CRW damage sustained by a control corn plant grown from untreated corn seed in the presence of CRW. In certain embodiments of the methods, the seed was treated with a composition that comprises a solid substance with adherent CRW-active *Methylobacterium* grown thereon or an emulsion having CRW-active *Methylobacterium* grown therein. In certain embodiments of the methods, the composition comprises the CRW-active *Methylobacterium* sp. at a titer of about $5\times10^8$, $1\times10^9$, or $1\times10^{10}$ colony-forming units per gram of the solid substance to about $5\times10^{13}$ colony-forming units of *Methylobacterium* per gram of the solid substance or at a titer of about $1\times10^6$ CFU/mL to about $1\times10^9$ CFU/mL for the emulsion. In certain embodiments, about $1\times10^2$, $1\times10^3$, or $1\times10^4$ CFU to about $1\times10^8$ or $1\times10^9$ CFU of the CRW-active *Methylobacterium* sp. are provided on a 100 $mm^2$ surface of a corn plant part. In certain embodiments, about $1\times10^2$, $1\times10^3$, or $1\times10^4$ CFU to about $1\times10^8$ or $1\times10^9$ CFU of the CRW-active *Methylobacterium* sp. are provided on the surface of a corn seed. In certain embodiments of the methods, the CRW-active *Methylobacterium* sp. is a *Methylobacterium* isolate selected from the group consisting of ISO01, ISO02, ISO03, ISO04, and ISO07. In certain embodiments of any of the aforementioned methods, the applied composition coats or partially coats the corn seed. In certain embodiments of any of the aforementioned methods, the composition further comprises an insecticide that provides for inhibition of CRW growth and/or reductions in CRW-mediated plant damage. In certain embodiments where the composition further comprises an insecticide, the insecticide is selected from the group consisting of a pyrethrin, synthetic pyrethroid, oxadiazine, chloronicotinyl, neonicotinoid, nitroguanidine insecticide, triazole, organophosphate, pyrrol, pyrazole, diacylhydrazine, biological/fermentation product, and a carbamate.

Also provided are compositions comprising a CRW-active *Methylobacterium* sp. and an agriculturally acceptable adjuvant and/or and agriculturally acceptable excipient. In certain embodiments, the composition comprises a solid substance with adherent CRW-active *Methylobacterium* grown thereon or an emulsion having CRW-active *Methylobacterium* grown therein. In certain embodiments, the composition comprises the CRW-active *Methylobacterium* sp. at a titer of about $5\times10^8$, $1\times10^9$, or $1\times10^{10}$ colony-forming units per gram of the solid substance to about $5\times10^{13}$ colony-forming units of *Methylobacterium* per gram of the solid substance or at a titer of about $1\times10^6$ CFU/mL to about $1\times10^9$ CFU/mL for the emulsion. In certain embodiments, about $1\times10^2$, $1\times10^3$, or $1\times10^4$ CFU to about $1\times10^8$ or $1\times10^9$ CFU of the CRW-active *Methylobacterium* sp. are provided on a 100 $mm^2$ surface of a corn plant part. In certain embodiments, about $1\times10^2$, $1\times10^3$, or $1\times10^4$ CFU to about $1\times10^8$ or $1\times10^9$ CFU of the CRW-active *Methylobacterium* sp. are provided on the surface of a corn seed. In certain embodiments, the CRW-active *Methylobacterium* sp. is selected from the group consisting of ISO01, ISO02, ISO03, ISO04, and ISO07. In certain embodiments, the composition further comprises an insecticide that provides for inhibition of CRW growth and/or reductions in CRW-mediated plant damage. In certain embodiments, the insecticide is selected from the group consisting of a pyrethrin, synthetic pyrethroid, oxadiazine, chloronicotinyl, neonicotinoid, nitroguanidine insecticide, triazole, organophosphate, pyrrol, pyrazole, diacylhydrazine, biological/fermentation product, and a carbamate.

Also provided herein is an isolated *Methylobacterium* sp. selected from the group consisting of ISO01, ISO02, ISO03, ISO04 and ISO07.

In certain embodiments of any of the aforementioned compositions comprising CRW-active *Methylobacterium* sp., corn plants or corn plant part that is coated or partially coated with a composition comprising a CRW-active *Methylobacterium* sp., methods of using the compositions to control CRW damage to plants, plant parts, and plants derived therefrom, and methods of making the compositions, the *Methylobacterium* sp. is heterologous to the plant or plant part to which it is applied. In certain embodiments where the plant or plant part is a field corn plant or field corn plant part, the CRW-active *Methylobacterium* sp. is not ISO7 (NLS0065). In certain embodiments where the plant or plant part is a sweet corn plant or sweet corn plant part, the CRW-active *Methylobacterium* sp. is ISO7 (NLS0065).

In certain embodiments of any of the aforementioned compositions comprising CRW-active *Methylobacterium* sp., corn plants or corn plant part that is coated or partially coated with a composition comprising a CRW-active *Methylobacterium* sp., methods of using the compositions to control CRW damage to plants, plant parts, and plants derived therefrom, and methods of making the compositions, the CRW-active *Methylobacterium* sp. is a derivative of a *Methylobacterium* sp. selected from the group consisting of ISO01, ISO02, ISO03, ISO04 and ISO07.

In certain embodiments of any of the aforementioned compositions, methods, plant, or plant parts, the CRW-active *Methylobacterium* sp. has a 16S RNA encoding sequence that has significant sequence identity to the 16S RNA encoding sequence of a CRW-active *Methylobacterium* sp. provided herein. In certain embodiments, the CRW-active *Methylobacterium* sp. has a 16S RNA encoding sequence that has at least 95%, 96%, 97%, 98%, 99%, or 99.5% sequence identity across the entire length of the 16S RNA encoding sequence of the CRW-active *Methylobacterium* sp. isolates ISO01, ISO02, ISO03, ISO04, and/or ISO07 provided herein. A CRW active *Methylobacterium* sp. that can be used in any of the composition, corn plants or corn plant parts that are coated or partially coated with the compositions, methods of using the compositions to control CRW damage to plants, plant parts, and plants derived therefrom, and methods of making the compositions can be CRW active *Methylobacterium* sp. can be a at least 95%, 96%, 97%, 98%, 99%, or 99.5% sequence identity across the entire length of the 16S RNA encoding sequences of SEQ ID NO:1, 2, 3, 4, and 5.

BRIEF DESCRIPTION OF THE DRAWINGS

The accompanying drawings, which are incorporated in and form a part of the specification, illustrate certain embodiments of the present disclosure. In the drawings.

DESCRIPTION

Definitions

Figure 1:
FIG. 1 compares lodging of untreated check plants (top) to plants treated with a CRW-active *Methylobacterium* at the V3 stage (bottom).
Figure 1:

As used herein, the phrases "adhered thereto" and "adherent" refer to *Methylobacterium* that are associated with a solid substance by growing, or having been grown, on a solid substance.

As used herein, the phrase "agriculturally acceptable adjuvant" refers to a substance that enhances the performance of an active agent in a composition for treatment of plants and/or plant parts. In certain compositions, an active agent can comprise a mono-culture or co-culture of *Methylobacterium.*

As used herein, the phrase "agriculturally acceptable excipient" refers to an essentially inert substance that can be used as a diluent and/or carrier for an active agent in a composition for treatment of plants and/or plant parts. In certain compositions, an active agent can comprise a mono-culture or co-culture of *Methylobacterium*.

As used herein, the term "*Methylobacterium*" refers to bacteria that are facultative methylotrophs of the genus *Methylobacterium*. The term *Methylobacterium*, as used herein, thus does not encompass species in the genera *Methylobacter, Methylomonas, Methylomicrobium, Methylococcus, Methylosinus, Methylocystis, Methylosphaera, Methylocaldum*, and *Methylocella*, which are obligate methanotrophs.

As used herein, the phrase "control plant" refers to a plant that had not received treatment with a CRW-active *Methylobacterium* or composition comprising the same at either the seed or any subsequent stage of the control plant's development. Control plants include, but are not limited to, non-transgenic plants, transgenic plants having a transgene-conferred CRW resistance trait, and plants treated with, or grown in soil treated with, an insecticidal compound or other agent that can protect a plant from CRW feeding. Control plants are also referred to herein as "checks."

As used herein, the terms "Corn Rootworm" and "CRW" are used interchangeable to refer to the larval or adult forms of any insect of the genus *Diabrotica*.

As used herein, the phrase "co-culture of *Methylobacterium*" refers to a *Methylobacterium* culture comprising at least two strains of *Methylobacterium* or at least two species of *Methylobacterium*.

As used herein, the phrase "contaminating microorganism" refers to microorganisms in a culture, fermentation broth, fermentation broth product, or composition that were not identified prior to introduction into the culture, fermentation broth, fermentation broth product, or composition.

As used herein, the phrase "derivatives thereof", when used in the context of a *Methylobacterium* isolate, refers to any strain that is obtained from the *Methylobacterium* isolate. Derivatives of a *Methylobacterium* isolate include, but are not limited to, variants of the strain obtained by selection, variants of the strain selected by mutagenesis and selection, and genetically transformed strains obtained from the *Methylobacterium* isolate.

As used herein, the term "emulsion" refers to a colloidal mixture of two immiscible liquids wherein one liquid is the continuous phase and the other liquid is the dispersed phase. In certain embodiments, the continuous phase is an aqueous liquid and the dispersed phase is liquid that is not miscible, or partially miscible, in the aqueous liquid.

As used herein, the phrase "essentially free of contaminating microorganisms" refers to a culture, fermentation broth, fermentation product, or composition where at least about 95% of the microorganisms present by amount or type in the culture, fermentation broth, fermentation product, or composition are the desired *Methylobacterium* or other desired microorganisms of pre-determined identity.

As used herein, the term "heterologous", when used in the context of *Methylobacterium* that at least partially coats a plant or plant part, refers to a *Methylobacterium* that is not naturally associated with a plant or plant part of the same species as the plant or plant part that is at least partially coated with the *Methylobacterium*. In certain embodiments, the heterologous *Methylobacterium* that is used to at least partially coat a plant or plant part of a first plant species is a *Methylobacterium* that was isolated, or can be isolated, from a second and distinct plant species.

As used herein, the phrase "inanimate solid substance" refers to a substance which is insoluble or partially soluble in water or aqueous solutions and which is either non-living or which is not a part of a still-living organism from which it was derived.

As used herein, the phrase "mono-culture of *Methylobacterium*" refers to a *Methylobacterium* culture consisting of a single strain of *Methylobacterium*.

As used herein, the phrase "partially coated", when used in the context of a composition comprising a CRW-active *Methylobacterium* sp. and a plant part (e.g., a seed), refers to a plant part where at least 10%, 20%, 40%, 50%, 60%, 70%, 80%, 90%, or 95% of the surface area of the plant part is coated with the composition.

As used herein, the term "peptide" refers to any polypeptide of 50 amino acid residues or less.

As used herein, the term "protein" refers to any polypeptide having 51 or more amino acid residues.

As used herein, a "pesticide" refers to an agent that is insecticidal, fungicidal, nematocidal, bacteriocidal, or any combination thereof.

As used herein, the phrase "bacteriostatic agent" refers to agents that inhibit growth of bacteria but do not kill the bacteria.

As used herein, the phrase "pesticide does not substantially inhibit growth of said *Methylobacterium*" refers to any pesticide that when provided in a composition comprising a fermentation product comprising a solid substance wherein a mono-culture or co-culture of *Methylobacterium* is adhered thereto, results in no more than a 50% inhibition of *Methylobacterium* growth when the composition is applied to a plant or plant part in comparison to a composition lacking the pesticide. In certain embodiments, the pesticide results in no more than a 40%, 20%, 10%, 5%, or 1% inhibition of *Methylobacterium* growth when the composition is applied to a plant or plant part in comparison to a composition lacking the pesticide.

As used herein, the term "PPFM bacteria" refers without limitation to bacterial species in the genus *Methylobacterium* other than *M. nodulans*.

As used herein, the phrase "solid substance" refers to a substance which is insoluble or partially soluble in water or aqueous solutions.

As used herein, the phrase "solid phase that can be suspended therein" refers to a solid substance that can be distributed throughout a liquid by agitation.

As used herein, the term "non-regenerable" refers to either a plant part or processed plant product that cannot be regenerated into a whole plant.

As used herein, the phrase "substantially all of the solid phase is suspended in the liquid phase" refers to media wherein at least 95%, 98%, or 99% of solid substance(s) comprising the solid phase are distributed throughout the liquid by agitation.

As used herein, the phrase "substantially all of the solid phase is not suspended in the liquid phase" refers to media where less than 5%, 2%, or 1% of the solid is in a particulate form that is distributed throughout the media by agitation.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

CRW-Active *Methylobacterium*, Compositions Comprising CRW-Active *Methylobacterium*, Methods of their Use, and Methods of Making Various CRW-active *Methylobacterium* isolates, compositions comprising these *Methylobacterium*, methods of using the compositions to inhibit CRW growth and/or reduce CRW damage to a plant, and methods of making the compositions are provided herein. As used herein, inhibition of the growth of a CRW includes any measurable decrease in CRW growth, where CRW growth includes, but is not limited to, any measurable increase in the larval weight, and/or any progression through larval development of from larval to adult development. As used herein, inhibition of CRW growth and/or reduction of CRW damage to a plant are also understood to include any measurable decrease in CRW feeding and/or the adverse effects caused by CRW feeding on a plant. Adverse effects of CRW feeding on a plant include, but are not limited to, any type of tissue damage or necrosis, especially to nodal roots of a corn plant, increased incidence of fungal disease, any type of yield reduction, and/or increased lodging.

Isolated CRW-active *Methylobacterium* sp. are provided herein. In certain embodiments, the *Methylobacterium* is selected from the group consisting of *M. aminovorans, M. extorquens, M. fujisawaense, M. mesophilicum, M. radiotolerans, M. rhodesianum, M. nodulans, M. phyllosphaerae, M. thiocyanatum*, and *M. oryzae*. In certain embodiments, *Methylobacterium* is not *M. radiotolerans* or *M. oryzae*. In certain embodiments, the CRW-active *Methylobacterium* isolate is selected from the group consisting of ISO01, ISO02, ISO03, ISO04, and ISO07. In certain embodiments, the CRW-active *Methylobacterium* isolate is selected from the group consisting of ISO02, ISO03, and ISO04. In certain embodiments, the CRW-active *Methylobacterium* provides for at least about 25%, at least about 50%, or at least about 75% reductions in CRW damage to a treated plant, plant arising from a treated seed, or plant grown in soil treated with the CRW in comparison to untreated control plants, plants arising from untreated seeds, or plants grown in untreated soils upon exposure to a CRW. In certain embodiments, the CRW that is inhibited is selected from the group consisting of a *Diabrotica balteata, Diabrotica barberi, Diabrotica undecimpunctata* and *Diabrotica virgifera* species.

In certain embodiments, the *Methylobacterium* is not *M. radiotolerans* or *M. oryzae*. In certain embodiments, the CRW-active *Methylobacterium* provides for at least about 25%, at least about 50%, or at least about 75% reductions in CRW growth on a treated plant, plant arising from a treated seed, or plant grown in soil treated with the CRW in comparison to a untreated control plants, plants arising from untreated seeds, or plants grown in untreated soils upon exposure to a CRW. In certain embodiments, the CRW-active *Methylobacterium* is a *Methylobacterium* that inhibits a *Diabrotica* sp. is selected from the group consisting of a *Diabrotica* balteata, *D. virgifera zea* Krysan & Smith, *Diabrotica barberi, Diabrotica undecimpunctata*, and *Diabrotica virgifera* species. In certain embodiments of any of the aforementioned compositions, the composition comprises a solid substance wherein a mono-culture or co-culture of *Methylobacterium* is adhered thereto. In certain embodiments where the *Methylobacterium* is adhered to a solid substance, the composition comprises a colloid formed by the solid substance wherein a mono-culture or co-culture of *Methylobacterium* is adhered thereto and a liquid. In certain embodiments, the colloid is a gel. In certain embodiments of certain aforementioned compositions, composition is an emulsion that does not contain a solid substance. In certain embodiments of any of the aforementioned compositions, the CRW-active *Methylobacterium* is selected from the group consisting of ISO01, ISO02, ISO03, ISO04, and ISO07. In certain embodiments of any of the aforementioned compositions, the CRW-active *Methylobacterium* is selected from the group consisting of ISO02, ISO03, and ISO04.

In certain embodiments, isolated CRW-active *Methylobacterium* sp. can be identified by treating a plant, a seed, soil in which the plant or a plant arising from the seed are grown, or other plant growth media in which the plant or a plant arising from the seed are grown and assaying for either reductions in CRW damage, CRW growth, CRW feeding activity, and combinations thereof. In still other embodiments, the CRW-active *Methylobacterium* sp., compositions comprising the same, fermentation products comprising the same, cell free exudates therefrom, or compounds derived therefrom can be incorporated into a CRW diet that is fed to CRW larvae and thus assayed for inhibition of larval growth, development, or feeding activity. Various assays that can adapted for use in identifying CRW-active *Methylobacterium* sp. are disclosed in U.S. Pat. No. 8,080,496, U.S. Patent Application Publication 20130116170, and U.S. Patent Publication No. 20120151634, which are each incorporated herein by reference in their entireties.

In certain embodiments, the CRW-active *Methylobacterium* sp. has a 16S RNA encoding sequence that has significant sequence identity to the 16S RNA encoding sequence of a CRW-active *Methylobacterium* sp. provided herein. In certain embodiments, the CRW-active *Methylobacterium* sp. has a 16S RNA encoding sequence that has at least 95%, 96%, 97%, 98%, 99%, or 99.5% sequence identity across the entire length of the 16S RNA encoding sequence of the CRW-active *Methylobacterium* sp. isolates ISO01, ISO02, ISO03, ISO04, and/or ISO07 provided herein. A CRW active *Methylobacterium* sp. that can be used in any of the composition, corn plants or corn plant parts that are coated or partially coated with the compositions, methods of using the compositions to control CRW damage to plants, plant parts, and plants derived therefrom, and methods of making the compositions can be CRW active *Methylobacterium* sp. can be a at least 95%, 96%, 97%, 98%, 99%, or 99.5% sequence identity across the entire length of the 16S RNA encoding sequences of SEQ ID NO:1, 2, 3, 4, and 5. The 16S RNA encoding sequences of SEQ ID NO:1, 2, 3, 4, and 5 are set forth in Table 1.

TABLE 1

16S RNA encoding sequences

| Isolate (NLS No.) | Isolate (ISO No.) | SEQ ID NO: |
|---|---|---|
| NLS0017 | ISO03 | SEQ ID NO: 1 |
| NLS0020 | ISO02 | SEQ ID NO: 2 |
| NLS0042 | ISO04 | SEQ ID NO: 3 |
| NLS0046 | ISO01 | SEQ ID NO: 4 |
| NLS0065 | ISO07 | SEQ ID NO: 5 |

Various *Methylobacterium* sp. isolates provided herein are disclosed in Table 2.

TABLE 2

*Methylobacterium* sp. Isolates

| ISOLATE No. | NLS No. | USDA ARS NRRL No.[1] |
|---|---|---|
| ISO01 | NLS0046 | NRRL B-50929 |
| ISO02 | NLS0020 | NRRL B-50930 |
| ISO03 | NLS0017 | NRRL B-50931 |

TABLE 2-continued

| Methylobacterium sp. Isolates | | |
|---|---|---|
| ISOLATE No. | NLS No. | USDA ARS NRRL No.[1] |
| ISO04 | NLS0042 | NRRL B-50932 |
| ISO07 | NLS0065 | NRRL B-50935 |

[1]Deposit number for strain deposited with the AGRICULTURAL RESEARCH SERVICE CULTURE COLLECTION (NRRL) of the National Center for Agricultural Utilization Research, Agricultural Research Service, U.S. Department of Agriculture, 1815 North University Street, Peoria, Illinois 61604 U.S.A. under the terms of the Budapest Treaty on the International Recognition of the Deposit of Microorganisms for the Purposes of Patent Procedure. Subject to 37 CFR §1.808(b), all restrictions imposed by the depositor on the availability to the public of the deposited material will be irrevocably removed upon the granting of any patent from this patent application.

Also provided herein are methods for controlling CRW that comprise applying any of the aforementioned compositions provided herein to a plant or a plant part in an amount that provides for inhibition of CRW damage in the plant, plant part, or a plant obtained therefrom relative to infection of a control plant, plant part, or plant obtained therefrom that had not received an application of the composition. In certain embodiments, application of the composition provides for at least about 5%, at least about 10%, at least about 20%, at least about 30%, at least about 40%, at least about 50%, at least about 75%, at least about 85%, or at least about 95% reduction of CRW damage in the plant, plant part, or a plant derived therefrom relative to infection of the control plant, plant part, or plant obtained therefrom. In certain embodiments, the plant part is selected from the group consisting of a leaf, a stem, a flower, a root, a tuber, a pollen grain, and a seed. In certain embodiments, the method further comprises the step of harvesting at least one plant part selected from the group consisting of a leaf, a stem, a flower, a root, a tuber, a pollen grain, or a seed from the plant or plant part. In certain embodiments of any of the aforementioned methods, the methods further comprise obtaining a processed food or feed composition from the plant or plant part. In certain embodiments, the processed food or feed composition is a meal or a paste. In certain embodiments of any of the aforementioned methods, the CRW-active *Methylobacterium* is selected from the group consisting of ISO01, ISO02, ISO03, ISO04, and ISO07. In certain embodiments, the CRW-active *Methylobacterium* is selected from the group consisting of ISO02, ISO03, and ISO04.

Also provided are methods of making the compositions useful for controlling CRW that comprise combining a CRW-active *Methylobacterium* with an agriculturally acceptable excipient and/or with an agriculturally acceptable adjuvant. In certain embodiments of the methods, the *Methylobacterium* sp., is selected from the group consisting of *M. aminovorans, M. extorquens, M. fujisawaense, M. mesophilicum, M. radiotolerans, M. rhodesianum, M. nodulans, M. phyllosphaerae, M. thiocyanatum*, and *M. oryzae*. In certain embodiments of the methods, the *Methylobacterium* is not *M. radiotolerans* or *M. oryzae*. In certain embodiments of the methods, the *Methylobacterium* is adhered to a solid substance. In certain embodiments of the methods, the *Methylobacterium* is adhered to the solid substance is combined with a liquid to form a composition that is a colloid. In certain embodiments of the methods, the colloid is a gel. In certain embodiments of the methods, the *Methylobacterium* adhered to the solid substance is provided by culturing the *Methylobacterium* in the presence of the solid substance. In certain embodiments of the methods, the composition comprises an emulsion. In certain embodiments of the methods, the *Methylobacterium* is provided by culturing the *Methylobacterium* in an emulsion. In certain embodiments of any of the aforementioned methods, the CRW-active *Methylobacterium* is selected from the group consisting of ISO01, ISO02, ISO03, ISO04, and ISO07. In certain embodiments, the CRW-active *Methylobacterium* is selected from the group consisting of ISO02, ISO03, and ISO04.

Methods where *Methylobacterium* are cultured in biphasic media comprising a liquid phase and a solid substance have been found to significantly increase the resultant yield of *Methylobacterium* relative to methods where the *Methylobacterium* are cultured in liquid media alone. In certain embodiments, the methods can comprise growing the *Methylobacterium* in liquid media with a particulate solid substance that can be suspended in the liquid by agitation under conditions that provide for *Methylobacterium* growth. In certain embodiments where particulate solid substances are used, at least substantially all of the solid phase can thus be suspended in the liquid phase upon agitation. Such particulate solid substances can comprise materials that are about 1 millimeter or less in length or diameter. In certain embodiments, the degree of agitation is sufficient to provide for uniform distribution of the particulate solid substance in the liquid phase and/or optimal levels of culture aeration. However, in other embodiments provided herein, at least substantially all of the solid phase is not suspended in the liquid phase, or portions of the solid phase are suspended in the liquid phase and portions of the solid phase are not suspended in the liquid phase. Non-particulate solid substances can be used in certain biphasic media where the solid phase is not suspended in the liquid phase. Such non-particulate solid substances include, but are not limited to, materials that are greater than about 1 millimeter in length or diameter. Such particulate and non-particulate solid substances also include, but are not limited to, materials that are porous, fibrous, or otherwise configured to provide for increased surface areas for adherent growth of the *Methylobacterium*. Biphasic media where portions of the solid phase are suspended in the liquid phase and portions of the solid phase are not suspended in the liquid phase can comprise a mixture of particulate and non-particulate solid substances. Such particulate and non-particulate solid substances used in any of the aforementioned biphasic media also include, but are not limited to, materials that are porous, fibrous, or otherwise configured to provide for increased surface areas for adherent growth of the *Methylobacterium*. In certain embodiments, the media comprises a colloid formed by a solid and a liquid phase. A colloid comprising a solid and a liquid can be pre-formed and added to liquid media or can be formed in media containing a solid and a liquid. Colloids comprising a solid and a liquid can be formed by subjecting certain solid substances to a chemical and/or thermal change. In certain embodiments, the colloid is a gel. In certain embodiments, the liquid phase of the media is an emulsion. In certain embodiments, the emulsion comprises an aqueous liquid and a liquid that is not miscible, or only partially miscible, in the aqueous liquid. Liquids that are not miscible, or only partially miscible, in water include, but are not limited to, any of the following: (1) liquids having a miscibility in water that is equal to or less than that of pentanol, hexanol, or heptanol at 25 degrees C.; (2) liquids comprising an alcohol, an aldehyde, a ketone, a fatty acid, a phospholipid, or any combination thereof; (3) alcohols selected from the group consisting of aliphatic alcohols containing at least 5 carbons and sterols; (4) an animal oil, microbial oil, synthetic oil, plant oil, or combination thereof; and/or, (5) a plant oil is selected from the group consisting of corn, soybean, cotton, peanut, sunflower, olive, flax, coconut, palm, rapeseed, sesame seed, safflower, and combinations thereof. In certain embodiments, the immiscible or partially immiscible liquid can comprises at least about 0.02% to about 20% of the liquid phase by mass. In certain embodiments, the methods can comprise obtaining a biphasic culture media comprising the liquid, the solid, and *Methylobacterium* and incubating the culture under conditions that provide for growth of the *Methylobacterium*. Biphasic culture medias comprising the liquid, the solid, and *Methylobacterium* can be obtained by a variety of methods that include, but are not limited to, any of: (a) inoculating a biphasic media comprising the liquid and the solid substance with *Methylobacterium*; (b) inoculating the solid substance with *Methylobacterium* and then introducing the solid substance comprising the *Methylobacterium* into the liquid media; (c) inoculating the solid substance with *Methylobacterium*, incubating the *Methylobacterium* on the solid substance, and then introducing the solid substance comprising the *Methylobacterium* into the liquid media; or (d) any combination of (a), (b), or (c). Methods and compositions for growing *Methylobacterium* in biphasic media comprising a liquid and a solid are disclosed in co-assigned US Patent Application Publication No. 20130324407, which is incorporated herein by reference in its entirety. Compositions comprising dried formulations of *Methylobacterium* that are adhered to solid substances, methods for making such compositions, and methods of applying those compositions to plants and plant parts including seeds are disclosed in co-assigned U.S. patent application Ser. No. 14/856,020, filed Sep. 16, 2015, which is incorporated herein by reference in its entirety.

Methods where *Methylobacterium* are cultured in media comprising an emulsion have also been found to significantly increase the resultant yield of *Methylobacterium* relative to methods where the *Methylobacterium* are cultured in liquid media alone. In certain embodiments, the methods for making the compositions provided herein can comprise growing the CRW-active *Methylobacterium* agent in an emulsion under conditions that provide for *Methylobacterium* growth. Medias comprising the emulsion and CRW-active *Methylobacterium* can be obtained by a variety of methods that include, but are not limited to, any of: (a) inoculating a media comprising the emulsion with *Methylobacterium*; (b) inoculating the aqueous liquid with the *Methylobacterium*, introducing the non-aqueous liquid, and mixing to form an emulsion; (c) inoculating the aqueous liquid with the *Methylobacterium*, introducing the non-aqueous liquid, and mixing to form an emulsion; or (d) any combination of (a), (b), or (c). In certain embodiments, the emulsion comprises an aqueous liquid and a liquid that is not miscible, or only partially miscible, in the aqueous liquid. Non-aqueous liquids that are not miscible, or only partially miscible, in water include, but are not limited to, any of the following: (1) liquids having a miscibility in water that is equal to or less than that of n-pentanol, n-hexanol, or n-heptanol at 25 degrees C.; (2) liquids comprising an alcohol, an aldehyde, a ketone, a fatty acid, a phospholipid, or any combination thereof; (3) alcohols is selected from the group consisting of aliphatic alcohols containing at least 5, 6, or 7 carbons and sterols; (4) an animal oil, microbial oil, synthetic oil, plant oil, or combination thereof; and/or, (5) a plant oil is selected from the group consisting of corn, soybean, cotton, peanut, sunflower, olive, flax, coconut, palm, rapeseed, sesame seed, safflower, and combinations thereof. In certain embodiments, the immiscible or partially immiscible non-aqueous liquid can comprise at least about 0.02% to about 20% of the emulsion by mass. In certain embodiments, the immiscible or partially immiscible non-aqueous liquid can comprise at least about any of about 0.05%, 0.1%, 0.5%, or 1% to about 3%, 5%, 10%, or 20% of the emulsion by mass. Methods and compositions for growing *Methylobacterium* in media comprising an emulsion are disclosed in co-assigned International Patent Application PCT/US14/40218, filed May 30, 2014, which is incorporated herein by reference in its entirety.

In certain embodiments, the fermentation broth, fermentation broth product, or compositions that comprise CRW-active *Methylobacterium* sp. can further comprise one or more introduced microorganisms of pre-determined identity other than *Methylobacterium*. Other microorganisms that can be added include, but are not limited to, microorganisms that are biopesticidal or provide some other benefit when applied to a plant or plant part. Biopesticidal or otherwise beneficial microorganisms thus include, but are not limited to, various *Bacillus* sp., *Pseudomonas* sp., *Coniothyrium* sp., *Pantoea* sp., *Streptomyces* sp., and *Trichoderma* sp. Microbial biopesticides can be a bacterium, fungus, virus, or protozoan. Particularly useful biopesticidal microorganisms include various *Bacillus subtilis, Bacillus thuringiensis, Bacillus pumilis, Pseudomonas syringae, Trichoderma harzianum, Trichoderma vixens*, and *Streptomyces lydicus* strains. Other microorganisms that are added can be genetically engineered or other isolates that are available as pure cultures. In certain embodiments, it is anticipated that the bacterial or fungal microorganism can be provided in the fermentation broth, fermentation broth product, or composition in the form of a spore.

In certain embodiments, the CRW-active *Methylobacterium* sp. and compositions comprising the same that are provided herein can be used in conjunction with transgenic plants that express gene products that are inhibitory to growth of certain CRW. Such transgenic plants include, but are not limited to, those expressing interfering RNA molecules (U.S. Patent Appl. No. 20130291188; PCT Appl. No. WO2007/035650), coleopteran active Cry3Bb1 proteins (U.S. Patent Appl. No. 20130031679; U.S. Pat. No. 7,227,056), modified Cry3A proteins (U.S. Patent Appl. Nos. 20120185973, 20130291188, and 20130116170), cry8-like proteins (U.S. Patent Appl. No 20090291896), DIG-10 toxins (U.S. Patent Appl. No. 20130247254), insecticidal secreted proteins (ISPs: U.S. Pat. No. 7,091,399); and one or both of the Cry34Ab1 and Cry35Ab1 proteins and variants thereof (U.S. Pat. Nos. 6,127,180, 6,624,145, 6,340,593, 6,083,499, 6,548,291 and 6,340,593; U.S. Pat. Appl. Nos. 20110275557, 20110154526, 20110154525). Each of the aforementioned patents and patent applications cited in reference to such transgenic plants is incorporated herein by reference in their entireties.

In certain embodiments, the CRW-active *Methylobacterium* sp. and compositions comprising the same that are provided herein can be used in conjunction with, or comprise, insecticides that also provide for inhibition of CRW growth and/or reductions in CRW-mediated plant damage. Such insecticides can be used in soil treatments (drenches, in furrow deposits, and the like) and/or in seed treatments. In certain embodiments, the insecticide is selected from the group consisting of pyrethrins, synthetic pyrethroids, oxadiazines, chloronicotinyls, neonicotinoids, nitroguanidine insecticides, triazoles, organophosphates, pyrrols, pyrazoles, diacylhydrazines, biological/fermentation products, and carbamates. In certain embodiments, the seed is treated with one or more of the aforementioned insecticides (U.S. Pat. Nos. 6,660,690, and 8,080,496, each incorporated herein by reference in their entireties). Commercial soil applied insecticide formulations that can be used in conjunction with the CRW-active *Methylobacterium* sp. provided herein include, but are not limited to, various FORCE™ (Amvac Chemical Corp, CA, USA), AZTEC™ (Amvac Chemical Corp, CA, USA), COUNTER™ (Amvac Chemical Corp, CA, USA), FORTRESS™ (Amvac Chemical Corp, CA, USA), FURADAN™ (FMC Corporation, PA, USA), GAUCHO™ (Bayer CropScience, NC, USA), PONCHO™ (Bayer CropScience, NC, USA), LORSBAN™ (Dow Agrosciences, IN, USA), REGENT™ (BASF Corporation, NC, USA), and THIMET™ (Amvac Chemical Corp, CA, USA) formulations. Combinations of the aforementioned insecticides and the aforementioned transgenic plants that provide for inhibition of CRW growth and/or reductions in CRW-mediated plant damage can also be used in conjunction with the CRW-active *Methylobacterium* sp. provided herein.

In certain embodiments, the liquid culture medium is prepared from inexpensive and readily available components, including, but not limited to, inorganic salts such as potassium phosphate, magnesium sulfate and the like, carbon sources such as glycerol, methanol, glutamic acid, aspartic acid, succinic acid and the like, and amino acid blends such as peptone, tryptone, and the like. Non-limiting examples of liquid media that can be used include, but are not limited to, ammonium mineral salts (AMS) medium (Whittenbury et al., 1970), Vogel-Bonner (VB) minimal culture medium (Vogel and Bonner, 1956), and LB broth ("Luria-Bertani Broth").

In general, the solid substance used in the methods and compositions that provide for the efficient growth of *Methylobacterium* can be any suitable solid substance which is insoluble or only partially soluble in water or aqueous solutions. Such suitable solid substances are also non-bacteriocidal or non-bacteriostatic with respect to CRW-active *Methylobacterium* sp. when the solid substances are provided in the liquid culture media. In certain embodiments, such suitable solid substances are also solid substances that are readily obtained in sterile form or rendered sterile. Solid substances used herein can be sterilized by any method that provides for removal of contaminating microorganisms and thus include, but are not limited to, methods such as autoclaving, irradiation, chemical treatment, and any combination thereof. These solid substances include substances of animal, plant, microbial, fungal, or mineral origin, manmade substances, or combinations of substances of animal, plant, microbial, fungal, or mineral origin and manmade substances. In certain embodiments, the solid substances are inanimate solid substances. Inanimate solid substances of animal, plant, microbial, or fungal origin can be obtained from animals, plants, microbes, or fungi that are inviable (i.e. no longer living) or that have been rendered inviable. Diatom shells are thus inanimate solid substances when previously associated diatom algae have been removed or otherwise rendered inviable. Since diatom shells are inanimate solid substances, they are not considered to be photosynthetic organisms or photosynthetic microorganisms. In certain embodiments, solid substances include, but are not limited to, sand, silt, soil, clay, ash, charcoal, diatomaceous earth and other similar minerals, ground glass or glass beads, ground ceramic materials, ceramic beads, bentonite, kaolin, talc, perlite, mica, vermiculite, silicas, quartz powder, montmorillonite, and combinations thereof. In certain embodiments, the solid substance can be a polymer or polymeric beads. Polymers that can be used as a solid substance include, but are not limited to, various polysaccharides such as cellulosic polymers and chitinous polymers which are insoluble or only partially soluble in water or aqueous solutions, agar (i.e. galactans), and combinations thereof. In certain embodiments, the solid substance can be an insoluble or only partially soluble salt crystal. Salt crystals that can be used include, but are not limited to, insoluble or only partially soluble carbonates, chromates, sulfites, phosphates, hydroxides, oxides, and sulfides. In certain embodiments, the solid substance can be a microbial cell, fungal cell, microbial spore, or fungal spore. In certain embodiments, the solid substance can be a microbial cell or microbial spore wherein the microbial cell or microbial spore is not a photosynthetic microorganism. In certain embodiments, the microbial cell or microbial spore is not a photosynthetic microorganism, where the photosynthetic microorganism is selected from the group consisting of algae, cyanobacteria, diatoms, *Botryococcus braunii, Chlorella, Dunaliella tertiolecta, Gracilaria, Pleurochrysis carterae, Sargassum*, and *Ulva*. In still other embodiments, the solid substance can be an inactivated (i.e. inviable) microbial cell, fungal cell, microbial spore, or fungal spore. In still other embodiments, the solid substance can be a quiescent (i.e. viable but not actively dividing) microbial cell, fungal cell, microbial spore, or fungal spore. In still other embodiments, the solid substance can be cellular debris of microbial origin. In still other embodiments, the solid substance can be particulate matter from any part of a plant. Plant parts that can be used to obtain the solid substance include, but are not limited to, cobs, husks, hulls, leaves, roots, flowers, stems, barks, seeds, and combinations thereof. Products obtained from processed plant parts including, but not limited to, bagasse, wheat bran, soy grits, crushed seed cake, stover, and the like can also be used. Such plant parts, processed plants, and/or processed plant parts can be milled to obtain the solid material in a particulate form that can be used. In certain embodiments, wood or a wood product including, but not limited to, wood pulp, sawdust, shavings, and the like can be used. In certain embodiments, the solid substance can be a particulate matter from an animal(s), including, but not limited to, bone meal, gelatin, ground or powdered shells, hair, macerated hide, and the like.

In certain embodiments, the solid substance is provided in a particulate form that provides for distribution of the solid substance in the culture media. In certain embodiments, the solid substance is comprised of particle of about 2 microns to about 1000 microns in average length or average diameter. In certain embodiments, the solid substance is comprised of particle of about 1 microns to about 1000 microns in average length or average diameter. In certain embodiments, the solid substance is a particle of about 1, 2, 4, 10, 20, or 40 microns to any of about 100, 200, 500, 750, or 1000 microns in average length or average diameter. Desirable characteristics of particles used in the methods and compositions provided herein include suitable wettability such that the particles can be suspended throughout the media upon agitation.

In certain embodiments, the solid substance is provided in the media as a colloid wherein the continuous phase is a liquid and the dispersed phase is the solid. Suitable solids that can be used to form colloids in liquid media used to grow CRW-active *Methylobacterium* sp. include, but are not limited to, various solids that are referred to as hydrocolloids. Such hydrocolloids used in the media, methods and compositions provided herein can be hydrophilic polymers, of plant, animal, microbial, or synthetic origin. Hydrocolloid polymers used in the methods can contain many hydroxyl groups and/or can be polyelectrolytes. Hydrocolloid polymers used in the compositions and methods provided herein include, but are not limited to, agar, alginate, arabinoxylan, carrageenan, carboxymethylcellulose, cellulose, curdlan, gelatin, gellan, β-glucan, guar gum, gum arabic, locust bean gum, pectin, starch, xanthan gum, and mixtures thereof. In certain embodiments, the colloid used in the media, methods, and compositions provided herein can comprise a hydrocolloid polymer and one or more proteins.

In certain embodiments, the solid substance can be a solid substance that provides for adherent growth of the CRW-active *Methylobacterium* sp. on the solid substance. CRW-active *Methylobacterium* sp. that are adhered to a solid substance are *Methylobacterium* that cannot be substantially removed by simply washing the solid substance with the adherent CRW-active *Methylobacterium* sp. with growth media whereas non-adherent *Methylobacterium* can be substantially removed by washing the solid substance with liquid growth media. In this context, "substantially removed" means that at least about 30%, 40%, 50%, 60%, 70%, or 80% the *Methylobacterium* present are removed when the solid substance is washed with three volumes of liquid growth media. Such washing can be effected by a variety of methods including, but not limited to, decanting liquid from a washed solid phase or passing liquid through a solid phase on a filter that permits flow through of bacteria in the liquid. In certain embodiments, the adherent CRW-active *Methylobacterium* sp. that are associated with the solid can include both *Methylobacterium* that are directly attached to the solid and/or *Methylobacterium* that are indirectly attached to the solid substance. *Methylobacterium* that are indirectly attached to the solid substance include, but are not limited to, *Methylobacterium* that are attached to another *Methylobacterium* or to another microorganism that is attached to the solid substance, *Methylobacterium* that are attached to the solid substance by being attached to another substance that is attached to the solid substance, and the like. In certain embodiments, at least 10%, 20%, 30%, 40%, 50%, 60%, 70%, 80%, 90%, 95%, 98%, 99%, 99.5% or 99.9% of the *Methylobacterium* in the fermentation broth, fermentation broth product, or compositions are *Methylobacterium* that are adhered to the solid substance. In certain embodiments, adherent CRW-active *Methylobacterium* sp. can be present on the surface of the solid substance in the fermentation broth, fermentation broth product, or composition at a density of at least about 1 *Methylobacterium*/20 square micrometers, of at least about 1 *Methylobacterium*/10 square micrometers, of at least about 1 *Methylobacterium*/10 square micrometers, of at least about 1 *Methylobacterium*/5 square micrometers, of at least about 1 *Methylobacterium*/2 square micrometers, or of at least about 1 *Methylobacterium*/square micrometer. In certain embodiments, adherent CRW-active *Methylobacterium* sp. can be present on the surface of the solid substance in the fermentation broth, fermentation broth product, or composition at a density of at least about 1 *Methylobacterium*/20 square micrometers to about 1 *Methylobacterium*/square micrometer, of at least about 1 *Methylobacterium*/10 square micrometers to about 1 *Methylobacterium*/square micrometer, of at least about 1 *Methylobacterium*/10 square micrometers to about 1 *Methylobacterium*/square micrometer, of at least about 1 *Methylobacterium*/5 square micrometers to about 1 *Methylobacterium*/square micrometer, or of at least about 1 *Methylobacterium*/2 square micrometers to about 1 *Methylobacterium*/square micrometer. In certain embodiments, adherent CRW-active *Methylobacterium* sp. can be present on the surface of the solid substance in the fermentation broth, fermentation broth product, or composition at a density of at least about 1 *Methylobacterium*/20 square micrometers to about 1 *Methylobacterium*/2 square micrometers, of at least about 1 *Methylobacterium*/10 square micrometers to about 1 *Methylobacterium*/2 square micrometers, of at least about 1 *Methylobacterium*/10 square micrometers to about 1 *Methylobacterium*/2 square micrometers, or of at least about 1 *Methylobacterium*/5 square micrometers to about 1 *Methylobacterium*/2 square micrometers. Biphasic fermentation broths provided herein can comprise a liquid phase that contains non-adherent *Methylobacterium*. In certain embodiments, titers of non-adherent *Methylobacterium* in the liquid phase can be less than about 100,000, 10,000, or 1,000 CFU/ml. In certain embodiments, the CRW-active *Methylobacterium* is selected from the group consisting of ISO01, ISO02, ISO03, ISO04, and ISO07. In certain embodiments, the CRW-active *Methylobacterium* is selected from the group consisting of ISO02, ISO03, and ISO04.

Biphasic culture methods provided can yield fermentation broths with CRW-active *Methylobacterium* sp. at a titer of greater than about $5\times10^8$ colony-forming units per milliliter, at a titer of greater than about $1\times10^9$ colony-forming units per milliliter, at a titer of greater than about $1\times10^{10}$ colony-forming units per milliliter, at a titer of at least about $3\times10^{10}$ colony-forming units per milliliter. In certain embodiments, fermentation broths provided herein can comprise CRW-active *Methylobacterium* sp. at a titer of at least about $5\times10^8$ colony-forming units per milliliter to at least about $3\times10^{10}$ colony-forming units per milliliter, at least about $5\times10^8$ colony-forming units per milliliter to at least about $4\times10^{10}$ colony-forming units per milliliter, or at least about $5\times10^8$ colony-forming units per milliliter to at least about $6\times10^{10}$ colony-forming units per milliliter. In certain embodiments, fermentation broths provided herein can comprise CRW-active *Methylobacterium* sp. at a titer of at least about $1\times10^9$ colony-forming units per milliliter to at least about $3\times10^{10}$ colony-forming units per milliliter, at least about $1\times10^9$ colony-forming units per milliliter to at least about $4\times10^{10}$ colony-forming units per milliliter, or at least about $1\times10^9$ colony-forming units per milliliter to at least about $6\times10^{10}$ colony-forming units per milliliter. In certain embodiments, fermentation broths provided herein will comprise CRW-active *Methylobacterium* sp. at a titer of at least about $1\times10^{10}$ colony-forming units per milliliter to at least about $3\times10^{10}$ colony-forming units per milliliter, at least about $1\times10^{10}$ colony-forming units per milliliter to at least about $4\times10^{10}$ colony-forming units per milliliter, or at least about $1\times10^{10}$ colony-forming units per milliliter to at least about $6\times10^{10}$ colony-forming units per milliliter. In certain embodiments, fermentation broths provided herein will comprise CRW-active *Methylobacterium* sp. at a titer of, at least about $3\times10^{10}$ colony-forming units per milliliter to at least about $4\times10^{10}$ colony-forming units per milliliter, or at least about $3\times10^{10}$ colony-forming units per milliliter to at least about $6\times10^{10}$ colony-forming units per milliliter. In certain embodiments, the CRW-active *Methylobacterium* is selected from the group consisting of ISO01, ISO02, ISO03, ISO04, and ISO07. In certain embodiments, the CRW-active *Methylobacterium* is selected from the group consisting of ISO02, ISO03, and ISO04.

Solid substances with adherent CRW-active *Methylobacterium* sp. can be obtained as fermentation products can be used to make various compositions useful for treating plants or plant parts to inhibit CRW growth or reduce CRW damage to a plant. Alternatively, compositions provided herein comprising CRW-active *Methylobacterium* sp., solid substances with CRW-active *Methylobacterium* sp. grown thereon, or comprising emulsions with CRW-active *Methylobacterium* sp. grown therein can be used to treat plants or plant parts. Plants, plant parts, and, in particular, plant seeds that have been at least partially coated or coated with the fermentation broth products or compositions comprising CRW-active *Methylobacterium* sp. are thus provided. Also provided are processed plant products that contain the fermentation broth products or compositions with CRW-active *Methylobacterium* sp. or adherent CRW-active *Methylobacterium* sp. Solid substances with adherent CRW-active *Methylobacterium* sp. can be used to make various compositions that are particularly useful for treating plant seeds. Seeds that have been at least partially coated with the fermentation broth products or compositions are thus provided. Also provided are processed seed products, including, but not limited to, meal, flour, feed, and flakes that contain the fermentation broth products or compositions provided herein. In certain embodiments, the processed plant product will be non-regenerable (i.e. will be incapable of developing into a plant). In certain embodiments, the solid substance used in the fermentation product or composition that at least partially coats the plant, plant part, or plant seed or that is contained in the processed plant, plant part, or seed product comprises a solid substance and associated or adherent CRW-active *Methylobacterium* sp. that can be readily identified by comparing a treated and an untreated plant, plant part, plant seed, or processed product thereof. In certain embodiments, the CRW-active *Methylobacterium* is selected from the group consisting of ISO01, ISO02, ISO03, ISO04, and ISO07. In certain embodiments, the CRW-active *Methylobacterium* is selected from the group consisting of ISO02, ISO03, and ISO04.

Compositions useful for treating plants or plant parts that comprise CRW-active *Methylobacterium* sp., a solid substance with adherent CRW-active *Methylobacterium* sp., or comprising emulsions with CRW-active *Methylobacterium* sp. grown therein can also further comprise an agriculturally acceptable adjuvant or an agriculturally acceptable excipient. An agriculturally acceptable adjuvant or an agriculturally acceptable excipient is typically an ingredient that does not cause undue phytotoxicity or other adverse effects when exposed to a plant or plant part. In certain embodiments, the solid substance can itself be an agriculturally acceptable adjuvant or an agriculturally acceptable excipient so long as it is not bacteriocidal or bacteriostatic to the *Methylobacterium*. In other embodiments, the composition further comprises at least one of an agriculturally acceptable adjuvant or an agriculturally acceptable excipient. Any of the aforementioned compositions can also further comprise a pesticide. Pesticides used in the composition include, but are not limited to, an insecticide, a fungicide, a nematocide, and a bacteriocide. In certain embodiments, the pesticide used in the composition is a pesticide that does not substantially inhibit growth of the *Methylobacterium*. As *Methylobacterium* are gram negative bacteria, suitable bacteriocides used in the compositions can include, but are not limited to, bacteriocides that exhibit activity against gram positive bacteria but not gram negative bacteria. Compositions provided herein can also comprise a bacteriostatic agent that does not substantially inhibit growth of the *Methylobacterium*. Bacteriostatic agents suitable for use in compositions provided herein include, but are not limited to, those that exhibit activity against gram positive bacteria but not gram negative bacteria. Any of the aforementioned compositions can also be an essentially dry product (i.e. having about 5% or less water content), a mixture of the composition with an emulsion, or a suspension.

Agriculturally acceptable adjuvants used in the compositions that comprise CRW-active *Methylobacterium* sp. include, but are not limited to, components that enhance product efficacy and/or products that enhance ease of product application. Adjuvants that enhance product efficacy can include various wetters/spreaders that promote adhesion to and spreading of the composition on plant parts, stickers that promote adhesion to the plant part, penetrants that can promote contact of the active agent with interior tissues, extenders that increase the half-life of the active agent by inhibiting environmental degradation, and humectants that increase the density or drying time of sprayed compositions. Wetters/spreaders used in the compositions can include, but are not limited to, non-ionic surfactants, anionic surfactants, cationic surfactants, amphoteric surfactants, organo-silicate surfactants, and/or acidified surfactants. Stickers used in the compositions can include, but are not limited to, latex-based substances, terpene/pinolene, and pyrrolidone-based substances. Penetrants can include mineral oil, vegetable oil, esterified vegetable oil, organo-silicate surfactants, and acidified surfactants. Extenders used in the compositions can include, but are not limited to, ammonium sulphate, or menthene-based substances. Humectants used in the compositions can include, but are not limited to, glycerol, propylene glycol, and diethyl glycol. Adjuvants that improve ease of product application include, but are not limited to, acidifying/buffering agents, anti-foaming/de-foaming agents, compatibility agents, drift-reducing agents, dyes, and water conditioners. Anti-foaming/de-foaming agents used in the compositions can include, but are not limited to, dimethopolysiloxane. Compatibility agents used in the compositions can include, but are not limited to, ammonium sulphate. Drift-reducing agents used in the compositions can include, but are not limited to, polyacrylamides, and polysaccharides. Water conditioners used in the compositions can include, but are not limited to, ammonium sulphate.

Methods of treating plants and/or plant parts with the fermentation broths, fermentation broth products, and compositions comprising CRW-active *Methylobacterium* sp. are also provided herein. Treated plants, and treated plant parts obtained therefrom, include, but are not limited to, corn, *Brassica* sp. (e.g., *B. napus, B. rapa, B. juncea*), alfalfa, rice, rye, sorghum, millet (e.g., pearl millet (*Pennisetum glaucum*), proso millet (*Panicum miliaceum*), foxtail millet (*Setaria italica*), finger millet (*Eleusine coracana*), sunflower, safflower, soybean, tobacco, potato, peanuts, cotton, sweet potato (*Ipomoea batatus*), cassava, coffee, coconut, pineapple, citrus trees, cocoa, tea, banana, avocado, fig, guava, mango, olive, *papaya*, cashew, macadamia, almond, sugar beets, sugarcane, oats, barley, tomatoes lettuce, green beans, lima beans, peas, cucurbits such as cucumber, cantaloupe, and musk melon, ornamentals, and conifers. Plant parts that are treated include, but are not limited to, leaves, stems, flowers, roots, seeds, fruit, tubers, coleoptiles, and the like. Ornamental plants and plant parts that can be treated include, but are not limited to azalea, *hydrangea*, hibiscus, roses, tulips, daffodils, petunias, carnation, poinsettia, and *chrysanthemum*. Seeds or other propagules of any of the aforementioned plants can be treated with the fermentation broths, fermentation broth products, fermentation products, and/or compositions provided herein.

In certain embodiments, plants and/or plant parts are treated by applying the fermentation broths, fermentation broth products, fermentation products, and compositions that comprise CRW-active *Methylobacterium* sp. as a spray. Such spray applications include, but are not limited to, treatments of a single plant part or any combination of plant parts. Spraying can be achieved with any device that will distribute the fermentation broths, fermentation broth products, fermentation products, and compositions to the plant and/or plant part(s). Useful spray devices include a boom sprayer, a hand or backpack sprayer, crop dusters (i.e. aerial spraying), and the like. Spraying devices and or methods providing for application of the fermentation broths, fermentation broth products, fermentation products, and compositions to either one or both of the adaxial surface and/or abaxial surface can also be used. Plants and/or plant parts that are at least partially coated with any of a biphasic fermentation broth, a fermentation broth product, fermentation product, or compositions that comprise a solid substance with CRW-active *Methylobacterium* sp. adhered thereto are also provided herein. Also provided herein are processed plant products that comprise a solid substance with CRW-active *Methylobacterium* sp. adhered thereto.

In certain embodiments, seeds are treated by exposing the seeds to the fermentation broths, fermentation broth products, fermentation products, and compositions that comprise CRW-active *Methylobacterium* sp. Seeds can be treated with the fermentation broths, fermentation broth products, and compositions provided herein by methods including, but not limited to, imbibition, coating, spraying, and the like. Seed treatments can be effected with both continuous and/or a batch seed treaters. In certain embodiments, the coated seeds can be prepared by slurrying seeds with a coating composition containing a fermentation broth, fermentation broth product, or compositions that comprise the solid substance with CRW-active *Methylobacterium* sp. and air drying the resulting product. Air drying can be accomplished at any temperature that is not deleterious to the seed or the *Methylobacterium*, but will typically not be greater than 30 degrees Centigrade. The proportion of coating that comprises a solid substance and CRW-active *Methylobacterium* sp. includes, but is not limited to, a range of 0.1 to 25% by weight of the seed, 0.5 to 5% by weight of the seed, and 0.5 to 2.5% by weight of seed. In certain embodiments, a solid substance used in the seed coating or treatment will have CRW-active *Methylobacterium* sp. adhered thereon. In certain embodiments, a solid substance used in the seed coating or treatment will be associated with CRW-active *Methylobacterium* sp. and will be a fermentation broth, fermentation broth product, or composition obtained by the methods provided herein. Various seed treatment compositions and methods for seed treatment disclosed in U.S. Pat. Nos. 5,106,648, 5,512,069, and 8,181,388 are incorporated herein by reference in their entireties and can be adapted for use with an active agent comprising the fermentation broths, fermentation broth products, or compositions provided herein. In certain embodiments, the composition used to treat the seed can contain agriculturally acceptable excipients that include, but are not limited to, woodflours, clays, activated carbon, diatomaceous earth, fine-grain inorganic solids, calcium carbonate and the like. Clays and inorganic solids that can be used with the fermentation broths, fermentation broth products, or compositions provided herein include, but are not limited to, calcium bentonite, kaolin, china clay, talc, perlite, mica, vermiculite, silicas, quartz powder, montmorillonite and mixtures thereof. Agriculturally acceptable adjuvants that promote sticking to the seed that can be used include, but are not limited to, polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses including ethylcelluloses and methylcelluloses, hydroxy methylcelluloses, hydroxypropylcellulose, hydroxymethylpropylcelluloses, polyvinyl pyrrolidones, alginates, dextrins, maltodextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylimide polymers and copolymers, polyhydroxyethyl acrylate, methylacrylimide monomers, alginate, ethylcellulose, polychloroprene and syrups or mixtures thereof. Other useful agriculturally acceptable adjuvants that can promote coating include, but are not limited to, polymers and copolymers of vinyl acetate, polyvinylpyrrolidone-vinyl acetate copolymer and water-soluble waxes. Various surfactants, dispersants, anticaking-agents, foam-control agents, and dyes disclosed herein and in U.S. Pat. No. 8,181,388 can be adapted for use with an active agent comprising the fermentation broths, fermentation broth products, or compositions provided herein.

Provided herein are compositions that comprise CRW-active *Methylobacterium* sp. that provide control of CRW damage to plants, plant parts, and plants obtained therefrom relative to untreated plants, plant parts, and plants obtained therefrom that have not been exposed to the compositions. In certain embodiments, plant parts, including, but not limited to, a seed, a leaf, a fruit, a stem, a root, a tuber, a pollen grain, or a coleoptile can be treated with the compositions provided herein to inhibit of CRW growth and/or reduce of CRW damage to a plant. Treatments or applications can include, but are not limited to, spraying, coating, partially coating, immersing, and/or imbibing the plant or plant parts with the compositions provided herein. In certain embodiments, a seed, a leaf, a fruit, a stem, a root, a tuber, or a coleoptile can be immersed and/or imbibed with a liquid, semi-liquid, emulsion, or slurry of a composition provided herein. Such seed immersion or imbibition can be sufficient to provide for inhibition of CRW growth and/or reductions in CRW damage in a treated plant or plant part in comparison to an untreated plant or plant part. Such for inhibition of CRW growth and/or reductions in CRW damage includes, but is not limited to decreases in larval growth, inhibition of larval development, disruption of larval feeding behaviors, and/or reductions in damage to roots, tubers, or other plant parts relative to untreated plants. In certain embodiments, plant seeds can be immersed and/or imbibed for at least 1, 2, 3, 4, 5, or 6 hours. Such immersion and/or imbibition can, in certain embodiments, be conducted at temperatures that are not deleterious to the plant seed or the *Methylobacterium*. In certain embodiments, the seeds can be treated at about 15 to about 30 degrees Centigrade or at about 20 to about 25 degrees Centigrade. In certain embodiments, seed imbibition and/or immersion can be performed with gentle agitation.

Amounts of the compositions that comprise CRW-active *Methylobacterium* sp. sufficient to provide for a reduction in CRW damage of a plant or plant part can thus be determined by measuring any or all of changes in CRW feeding behavior, CRW growth and/or the adverse effects of CRW feeding in treated plants or plant parts relative to untreated plants or plant parts. Adverse effects of CRW growth in a plant that can be measured include any type of plant tissue damage or necrosis, any type of plant yield reduction, any reduction in the value of the crop plant product, and/or production of undesirable fungal metabolites or fungal growth by-products including but not limited to mycotoxins. In certain embodiments, an Iowa 1-6 CRW damage rating system where a value of 1 equals no injury or only a few minor feeding scars, a value of 2 equals feeding injury evident, but no roots eaten back to 11/2 inches of the plant, a value of 3 equals at least one root eaten off to within 11/2 inches of the plant, but never an entire node of roots destroyed, a value of 4 equals one node of roots eaten back to within 11/2 inches of the plant, a value of 5 equals two nodes of roots eaten back to within 11/2 inches of the plant, and a value of 6 equals three nodes of roots eaten back to within 11/2 inches of the plant can also be used to determine amounts of the compositions sufficient to provide for a reduction in CRW damage to a plant or plant part. Mycotoxins comprise a number of toxic molecules produced by fungal species, including but not limited to polyketides (including aflatoxins, demethylsterigmatocystin, O-methylsterigmatocystin etc.), fumonisins, alperisins (e.g., $A_1$, $A_2$, $B_1$, $B_2$), sphingofungins (A, B, C and D), trichothecenes, fumifungins, and the like. Methods of quantitating mycotoxin levels are widely documented. Moreover, commercial kits for measurement of the mycotoxins such as aflatoxin, fumonisin, deoxynivalenol, and zearalenone are also available (VICAM, Watertown, MA, USA).

Compositions provided herein comprising CRW-active *Methylobacterium* sp. are therefore expected to be useful in inhibiting CRW growth and/or reducing CRW damage in a wide variety of plants, including, but not limited to: corn, cucumber, cantaloupe, squash, gourd, and pumpkin, common bean, lima bean, sweet potato, soybean, and winged bean, tomato, potato, cassava, rice, sorghum, wheat, cabbage, peanut, watermelon, bell pepper, pea, beet, okra, onion, and lettuce. Compositions provided herein comprising CRW-active *Methylobacterium* sp. are also expected to be useful in inhibiting growth and/or reducing damage caused by *Diabrotica* balteata, *D. virgifera zea* Krysan & Smith, *Diabrotica barberi, Diabrotica* undecimpunctata and/or *Diabrotica virgifera* species.

In certain embodiments, an amount of a composition provided herein that is sufficient to provide for inhibition of CRW damage in a plant or plant part can be a composition with CRW-active *Methylobacterium* sp. at a titer of at least about $1\times10^4$ colony-forming units per milliliter, at least about $1\times10^5$ colony-forming units per milliliter, at least about $1\times10^6$ colony-forming units per milliliter, at least about $5\times10^6$ colony-forming units per milliliter, at least about $1\times10^7$ colony-forming units per milliliter, at least about $5\times10^8$ colony-forming units per milliliter, at least about $1\times10^9$ colony-forming units per milliliter, at least about $1\times10^{10}$ colony-forming units per milliliter, or at least about $3\times10^{10}$ colony-forming units per milliliter. In certain embodiments, an amount of a composition provided herein that is sufficient to provide for inhibition of CRW growth and/or reduction of CRW damage to a plant or plant part can be a composition with CRW-active *Methylobacterium* sp. at a titer of at least about $1\times10^4$ colony-forming units per milliliter, at least about $1\times10^5$ colony-forming units per milliliter, about least about $1\times10^6$ colony-forming units per milliliter, at least about $5\times10^6$ colony-forming units per milliliter, at least about $1\times10^7$ colony-forming units per milliliter, or at least about $5\times10^8$ colony-forming units per milliliter to at least about $6\times10^{10}$ colony-forming units per milliliter of a liquid or an emulsion. In certain embodiments, an amount of a composition provided herein that is sufficient to provide for inhibition of CRW growth and/or reduction of CRW damage to a plant or plant part can be a fermentation broth product with a CRW-active *Methylobacterium* sp. titer of a solid phase of that product is at least about $1\times10^4$ colony-forming units per gram, at least about $1\times10^5$ colony-forming units per gram, at least about $1\times10^6$ colony-forming units per gram, at least about $5\times10^6$ colony-forming units per gram, at least about $1\times10^7$ colony-forming units per gram, or at least about $5\times10^8$ colony-forming units per gram to at least about $6\times10^{10}$ colony-forming units of *Methylobacterium* per gram, at least about $1\times10^{11}$ colony-forming units of *Methylobacterium* per gram, at least about $1\times10^{12}$ colony-forming units of *Methylobacterium* per gram, at least about $1\times10^{13}$ colony-forming units of *Methylobacterium* per gram, or at least about $5\times10^{13}$ colony-forming units of *Methylobacterium* per gram of the solid phase. In certain embodiments, an amount of a composition provided herein that is sufficient to provide for inhibition of CRW growth and/or reduction of CRW damage to a plant or plant part can be a composition with a *Methylobacterium* titer of at least about $1\times10^6$ colony-forming units per gram, at least about $5\times10^6$ colony-forming units per gram, at least about $1\times10^7$ colony-forming units per gram, or at least about $5\times10^8$ colony-forming units per gram to at least about $6\times10^{10}$ colony-forming units of *Methylobacterium* per gram, at least about $1\times10^{11}$ colony-forming units of *Methylobacterium* per gram, at least about $1\times10^{12}$ colony-forming units of *Methylobacterium* per gram, at least about $1\times10^{13}$ colony-forming units of *Methylobacterium* per gram, or at least about $5\times10^{13}$ colony-forming units of *Methylobacterium* per gram of particles in the composition containing the particles that comprise a solid substance wherein a mono-culture or co-culture of CRW-active *Methylobacterium* sp. is adhered thereto. In certain embodiments, an amount of a composition provided herein that is sufficient to provide for inhibition of CRW growth and/or reduction of CRW damage to a plant or plant part can be a composition with a *Methylobacterium* titer of at least about $1\times10^6$ colony-forming units per mL, at least about $5\times10^6$ colony-forming units per mL, at least about $1\times10^7$ colony-forming units per mL, or at least about $5\times10^8$ colony-forming units per mL to at least about $6\times10^{10}$ colony-forming units of *Methylobacterium* per mL in a composition comprising an emulsion wherein a mono-culture or co-culture of a CRW-active *Methylobacterium* sp. adhered to a solid substance is provided therein or grown therein. In certain embodiments, an amount of a composition provided herein that is sufficient to provide for inhibition of CRW growth and/or reduction of CRW damage to a plant or plant part can be a composition with a *Methylobacterium* titer of at least about $1\times10^6$ colony-forming units per mL, at least about $5\times10^6$ colony-forming units per mL, at least about $1\times10^7$ colony-forming units per mL, or at least about $5\times10^8$ colony-forming units per mL to at least about $6\times10^{10}$ colony-forming units of *Methylobacterium* per mL of in a composition comprising an emulsion wherein a mono-culture or co-culture of a CRW-active *Methylobacterium* sp. is provided therein or grown therein.

EXAMPLES

The following examples are included to demonstrate certain embodiments. It will be appreciated by those of skill in the art that the techniques disclosed in the following examples represent techniques determined by the Applicants to function well in the practice of the disclosure. However, those of skill in the art should, in light of the instant disclosure, appreciate that many changes can be made in the specific embodiments that are disclosed, while still obtaining like or similar results, without departing from the scope of the invention.

Example 1. Reductions in CRW-Mediated Plant Lodging and Yield Loss by *Methylobacterium* Cultures A corn trial was established at Cropsey IL May 13, 2013 for the purpose of evaluating 14 PPFM (pink-pigmentedfacultative-methylotrophs of the species *Methylobacterium*) isolates applied as a foliar spray to corn plants at an early vegetative stage (V1) and also at a reproductive stage (R1). The trial was located in a geographic area of East-Central Illinois that historically has experienced high levels of Western corn rootworm (*Diabrotica virgifera virgifera* LeConte) infestation and attendant reduced yields and damage to corn crops.

Experimental Design

The field trial was conducted as a split design consisting of four 30-inch rows that were each 20 feet long. The two middle rows were the treatment rows, the two outside rows were used as untreated border rows. There were eight replications of each of the 14 PPFM treatments for application at growth stages V3 and R1. The 14 PPFM treatments plus the control (no PPFM treatment) comprised the whole plot, and the growth stage V3 and R1 comprised the split plot. There was a V3 and R1 check (no PPFM control) included in each of the 8 replications.

Methods

In preparation for the field trials, the PPFM cultures described in Table 2 were grown in media comprising Ammonium Mineral Salts (AMS), glycerol, peptone, and diatomaceous earth (2 grams/liter), at 30° C. for 6 days essentially as described in co-assigned U.S. Patent Application Publication No. US20130324407 and incorporated herein by reference in its entirety. The cultures comprising PPFM exhibiting adherent growth to the diatomaceous earth were then harvested by centrifugation at 5000 rpm for 15 minutes and then re-suspended in AMS+glycerol+peptone with 20% glycerol as a cryoprotectant at 10× concentration. The fermentation products comprising the diatomaceous earth with the adherent *Methylobacterium* were aliquoted and frozen at −80 until thawed for use.

A corn hybrid containing transgenic events MON88017×MON89034 (GENUITY VT TRIPLE PRO™; Monsanto, St. Louis, MO, USA) was used for protection against insect pests including Western Corn Rootworm (*Diabrotica virgifera virgifera* LeConte). The MON 89034 transgenic insertion event expresses the Cry1A.105 and Cry2Ab2 *Bacillus thuringiensis* proteins, which confer resistance to lepidopteran insect pests. The MON88017 transgenic insertion event produces an engineered *Bacillus thuringiensis* Cry3Bb1 protein, which can confer resistance to certain susceptible Corn Rootworm, and a CP4 EPSPS gene that confers tolerance to glyphosate. The corn seed was also treated with PONCHO™ 500 (Bayer Crop Science, North Carolina, USA), an insecticidal seed treatment containing clothianidin for protection against soil insect pests. A fermentation product comprising adherent PPFM that had grown on the diatomaceous earth was applied to the corn at the V3 and R1 stages at a rate of 15 gal per acre using a backpack chemical sprayer. The PPFM application rates are provided below in Tables 2 and 3. The trial was managed with local agronomic practices throughout the growing season (glyphosate herbicide was applied at V4 stage and nitrogen (N) fertilizer applied at 140 lbs/acre, etc) and harvested for yield with a commercial harvest combine.

TABLE 2

Titers of PPFMs Applied at the R1 Stage at Indicated Locations (in CFU/mL)

| NLS # | Isolate | Cropsey Titer |
|---|---|---|
| 0046 | ISO01 | 8.6E+08 |
| 0020 | ISO02 | 1.2E+09 |
| 0017 | ISO03 | 2.8E+08 |
| 0042 | ISO04 | 2.4E+08 |
| 0089 | ISO05 | 6.7E+08 |
| 0068 | ISO06 | 3.1E+08 |
| 0065 | ISO07 | 3.8E+08 |
| 0069 | ISO08 | 2.0E+08 |
| 0062 | ISO09 | 1.0E+08 |
| 0064 | ISO10 | 8.9E+08 |
| 0021 | ISO11 | 9.7E+07 |
| 0066 | ISO12 | 5.6E+08 |
| 0037 | ISO13 | ND[1] |
| 0038 | ISO14 | 1.3E+08 |

[1]ND: Not determined.

TABLE 3

Titers of PPFMs Applied at the V3 Stage at Indicated Locations (in CFU/mL)

| NLS # | Isolate | Cropsey Titer |
|---|---|---|
| 0046 | ISO01 | 5.3E+08 |
| 0020 | ISO02 | 1.0E+09 |
| 0017 | ISO03 | 4.4E+08 |
| 0042 | ISO04 | 5.6E+08 |
| 0089 | ISO05 | 7.0E+07 |
| 0068 | ISO06 | 2.9E+08 |
| 0065 | ISO07 | 3.7E+08 |
| 0069 | ISO08 | 4.3E+08 |
| 0062 | ISO09 | ND[1] |
| 0064 | ISO10 | 1.1E+09 |
| 0021 | ISO11 | ND[1] |
| 0066 | ISO12 | 2.9E+08 |
| 0037 | ISO13 | 1.5E+08 |
| 0038 | ISO14 | 2.4E+08 |

[1]ND: Not determined.

Figure 2:
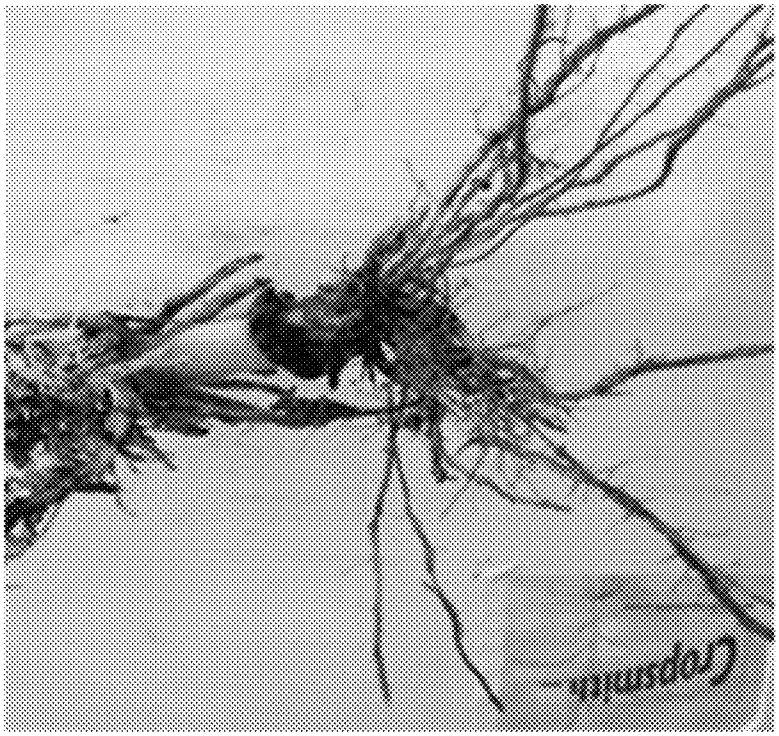
FIG. 2 compares CRW damage to roots of untreated check plants (top) to the roots of plants treated with a CRW-active *Methylobacterium* at the V3 stage (bottom).
Figure 2:
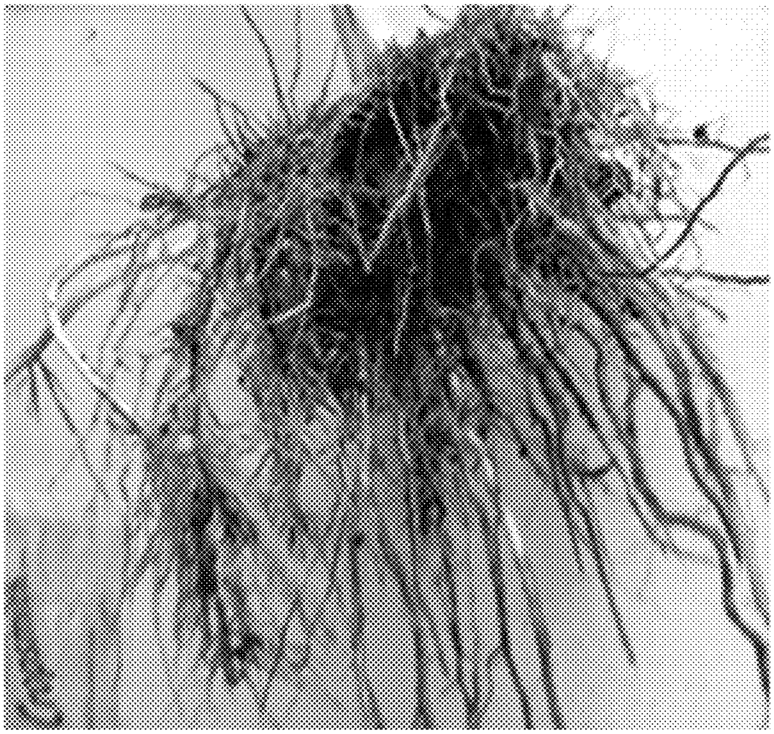

Approximately 14 days after the R1 stage, substantial corn root lodging occurred in certain plants but did not occur in other plants treated with certain PPFM isolates (FIG. 1). Root lodging occurs when the roots cannot keep the plant upright in the face of strong winds, and the plants lean over- or lodge and is a known outcome of corn rootworm feeding on nodal roots. Inspection of the nodal roots of the untreated check plants showed evidence of CRW damage to the nodal roots, indicating that the field test contained CRW that were resistant to the Cry3Bb1 protein (FIG. 2).

A percent lodging rating was taken in the plots to determine if any of the PPFM isolates had an effect on lodging. These ratings were transformed using the arcsine square root transformation (square root of (% lodged/100)), which is a standard transformation for binomial proportions. The plots were harvested for bushel/acre yield with a commercial harvest combine. Trial data were collected, entered into EXCEL™ (Microsoft Corp., Seattle, WA), and analyzed using the ANALYZE/FIT MODEL platform in JMP (JMP software Version 10.0.1 from SAS Institute Inc.). Analyses within each site were conducted using analysis of variance with fixed treatment effects and random effects for replicates. Means of the treatments were compared using pairwise contrasts of the least-squares means from the ANOVA model within JMP.

Results

For the transformed lodging rating data (Table 4), the analyses showed that, at stage V3, seven of the fourteen isolates had a lower mean transformed value than the control, and the differences were significant at the p=0.2 level, isolate 3 showed the greatest reduction in root lodging (p=0.06). We observed that the control plants had visibly less roots, and evidence of corn rootworm larval feeding. The plants treated with a CRW-active *Methylobacterium* isolate had a much more vigorous and intact root system. The difference in root masses between these two treatments can be seen in FIG. 2. There were no isolates that showed a reduction in lodging vs the check at the R1 application stage. One isolate, isolate 14, had a significantly higher mean than the check (p=0.017) at the R1 stage.

TABLE 4

Effect of fourteen PPFM isolates on root lodging rating, arc-sine transformed data

| PPFM Isolate | Stage | % Lodging rating means | Std Err | Arc sine means | Δ (Isolate − Check) | P value |
|---|---|---|---|---|---|---|
| ISO03 | V3 | 19.0 | 4.1 | 0.434 | −0.331 | 0.063 |
| ISO07 | V3 | 28.6 | 9.9 | 0.484 | −0.281 | 0.126 |
| ISO02 | V3 | 22.8 | 7.2 | 0.489 | −0.276 | 0.148 |
| ISO01 | V3 | 27.4 | 13.3 | 0.514 | −0.251 | 0.212 |
| ISO09 | V3 | 26.3 | 8.9 | 0.521 | −0.244 | 0.170 |
| ISO04 | V3 | 30.7 | 9.7 | 0.541 | −0.224 | 0.220 |
| ISO10 | V3 | 28.8 | 10.0 | 0.541 | −0.224 | 0.207 |
| ISO12 | V3 | 33.4 | 12.4 | 0.569 | −0.196 | 0.286 |
| ISO05 | V3 | 40.0 | 11.0 | 0.668 | −0.097 | 0.583 |
| ISO11 | V3 | 38.9 | 11.7 | 0.669 | −0.096 | 0.599 |
| Check | V3 | 52.5 | 12.8 | 0.765 | 0.000 | — |
| ISO08 | V3 | 49.2 | 9.6 | 0.781 | 0.016 | 0.931 |
| ISO13 | V3 | 50.9 | 10.9 | 0.785 | 0.020 | 0.908 |
| ISO06 | V3 | 50.0 | 12.1 | 0.808 | 0.043 | 0.811 |
| ISO14 | V3 | 63.3 | 10.4 | 0.933 | 0.168 | 0.376 |
| ISO07 | R1 | 27.9 | 12.1 | 0.497 | −0.100 | 0.581 |
| ISO10 | R1 | 29.0 | 10.1 | 0.498 | −0.099 | 0.576 |
| ISO08 | R1 | 30.0 | 10.6 | 0.550 | −0.047 | 0.803 |
| ISO09 | R1 | 31.3 | 9.2 | 0.568 | −0.029 | 0.870 |
| ISO02 | R1 | 27.5 | 9.6 | 0.569 | −0.028 | 0.882 |
| ISO12 | R1 | 33.1 | 12.3 | 0.569 | −0.028 | 0.878 |
| ISO13 | R1 | 35.6 | 12.8 | 0.596 | −0.001 | 0.993 |
| Check | R1 | 35.8 | 13.7 | 0.597 | 0.000 | — |
| ISO05 | R1 | 34.4 | 10.2 | 0.605 | 0.008 | 0.968 |
| ISO04 | R1 | 38.4 | 11.8 | 0.633 | 0.036 | 0.846 |
| ISO03 | R1 | 44.4 | 11.4 | 0.692 | 0.095 | 0.594 |
| ISO11 | R1 | 40.7 | 11.4 | 0.696 | 0.099 | 0.588 |
| ISO01 | R1 | 43.0 | 8.5 | 0.725 | 0.128 | 0.525 |
| ISO06 | R1 | 50.0 | 12.3 | 0.787 | 0.190 | 0.300 |
| ISO14 | R1 | 75.0 | 7.4 | 1.057 | 0.460 | 0.017 |

In the analysis conducted on plot yields for each treatment, ISO02 applied at the V3 stage had a significant (p=0.2) yield increase over the check (Table 5).

TABLE 5

Effect of fourteen PPFM isolates on corn yield

| PPFM Isolate | Stage | MeanYield Bu/Acre | Δ (Isolate-Check) | P value |
|---|---|---|---|---|
| ISO02 | V3 | 80.926 | 15.564 | 0.250 |
| ISO03 | V3 | 78.717 | 13.355 | 0.307 |
| ISO04 | V3 | 77.373 | 12.011 | 0.345 |
| ISO07 | V3 | 69.799 | 4.436 | 0.734 |
| ISO01 | V3 | 69.094 | 3.732 | 0.784 |
| ISO12 | V3 | 67.159 | 1.796 | 0.891 |
| Check | V3 | 65.362 | — | — |
| ISO10 | V3 | 65.347 | −0.015 | 0.999 |
| ISO08 | V3 | 64.507 | −0.855 | 0.948 |
| ISO05 | V3 | 62.998 | −2.364 | 0.852 |
| ISO13 | V3 | 61.054 | −4.308 | 0.734 |
| ISO11 | V3 | 58.910 | −6.452 | 0.611 |
| ISO09 | V3 | 58.291 | −7.071 | 0.578 |
| ISO14 | V3 | 55.347 | −10.015 | 0.445 |
| ISO06 | V3 | 53.533 | −11.829 | 0.367 |
| ISO07 | R1 | 71.968 | 7.974 | 0.530 |
| ISO05 | R1 | 71.475 | 7.482 | 0.556 |
| ISO02 | R1 | 70.717 | 6.724 | 0.596 |
| ISO08 | R1 | 69.364 | 5.371 | 0.691 |
| ISO13 | R1 | 67.563 | 3.569 | 0.779 |
| ISO03 | R1 | 66.214 | 2.220 | 0.861 |
| ISO09 | R1 | 64.878 | 0.885 | 0.944 |
| ISO01 | R1 | 64.429 | 0.435 | 0.976 |
| Check | R1 | 63.994 | — | — |
| ISO04 | R1 | 59.695 | −4.299 | 0.741 |
| ISO11 | R1 | 59.491 | −4.503 | 0.730 |
| ISO12 | R1 | 58.335 | −5.659 | 0.666 |
| ISO10 | R1 | 57.868 | −6.126 | 0.629 |
| ISO06 | R1 | 49.734 | −14.259 | 0.277 |
| ISO14 | R1 | 41.982 | −22.012 | 0.106 |

There was a range in the degree of response to corn rootworm feeding across the 14 isolates tested. Isolates ISO02, ISO03 and ISO04 exhibited a reduction in root lodging and also increased corn yields in comparison to the untreated checks, which are indicative of reductions in CRW damage to the plants treated with those isolates. Isolates ISO11, ISO09, ISO14, and ISO06 appear to be CRW inactive *Methylobacterium* sp. in so far as they did not provide for significant reductions in reductions in CRW damage when compared to a check. Treatment with ISO14 appeared to result in increased CRW damage in comparison to untreated control plants in both lodging and yield tests.

Example 2. Treatment of Seedlings with *Methylobacterium* sp.

The fourteen PPFM strains ISO1-ISO14 were tested in the following manner. Bacterial cultures at a titer of 1×10E7 to 1×10E9 colony forming units/milliliter were used to coat 3-day-old sterile corn seedlings (germinated at 28 degrees) in sterilized soil mix in sundae cups, and the plants were watered and covered with a lid. The following day, 10 corn rootworm (CRW) larvae (1st instars) were transferred to each cup. Seedlings were grown at 25 degrees centigrade in a growth chamber for 14 additional days (18 days total) before harvest. The soil component containing roots and larvae were placed in Berlese funnels to collect live larvae. Each experiment included 3 reps each of controls and samples both with and without CRW larvae, and the experiment was repeated 4×. Data collected included shoot and root dry weights as well as number and size of larvae. There were no statistically significant differences between PPFM-treated plants and controls at $p<0.05$ in shoot and root dry weights. There were also no statistically significant differences in the number and size of recovered larvae from PPFM-treated plants and controls at $p<0.05$.

Example 3. Reductions in Corn Root Worm-Mediated Plant Root Damage by *Methylobacterium* Cultures in 2015 Field Tests Field tests were conducted during the 2015 growing season for the purpose of evaluating the effects of two PPFM isolates (NewLeaf Symbiotics *Methylobacterium* strains ISO02 [NLS0020] and ISO04 [NLS0042]) on larval corn root worm (CRW) feeding damage to corn plants. PPFMs were applied as in-furrow treatments at seeding, and as foliar sprays to corn plants at a vegetative stage V3. The trials were located at sites in Whitewater, WI, USA and Dana, IA, USA. These two sites were chosen because they historically have high levels of Western corn rootworm (*Diabrotica virgifera virgifera* LeConte; CRW) infestation due to repeated growth of corn on the same site in successive growing seasons.

The field trials were conducted as a Randomized Complete Block Design consisting of four 30-inch rows, 40 feet long, per treatment. There were six replications each of the two PPFM treatments and two checks (no PPFM in furrow or foliar controls). PPFM cultures were grown in media comprising Ammonium Mineral Salts (AMS), glycerol, peptone, and diatomaceous earth (2 grams/liter), harvested by centrifugation and re-suspended at 10× concentration in AMS+glycerol+peptone with 20% glycerol. The PPFMs were frozen at −80° C. until thawed for use. The corn hybrid selected was Syngenta G9E98-3000GT, with a relative maturity of 108 to 109 days. Both the PPFM-treated test plants and the non-treated checks were treated with Cruiser™ MAXX (Mefenoxam, Flidioxonil, and Thiamethoxam; Syngenta Crop Protection, NC, USA). Local agronomic practices were used throughout the growing season. PPFMs were applied at the concentrations provided in Table 6. The two middle rows were evaluated for plant count/emergence/stand at 14-days-after-planting (DAP), and vigor at 14- and 60-DAP. At harvest, stalk diameters at six inches and first internode length above six inches were recorded. Yield at harvest includes bushels/acre, grain moisture and test weight. At V3, ten plants were randomly removed from the outside rows of the in-furrow treatments (five from each side). The roots were washed, bagged and shipped on ice for evaluation. At the Whitewater site, roots were suspended in water, scanned, and analyzed using the standard version of WinRhizo™ software (Regent Instruments Inc. Canada; available on the http internet site "regent.qc.ca/assets/winrhizo_software.html"). At R1 (corn silking stage) ten plants were dug from the border rows. The roots were washed and rated using a node injury scale to quantify progressive feeding by corn root worm larvae (Oleson, J. D., Park, Y., Nowatzki, T. M., and Tollefson, J. J. (2005) Node-Injury Scale to Evaluate Root Injury by Corn Rootworms (Coleoptera: Chrysomelidae) Journal of Economic Entomology 98 (1) 1-8).

At the Dana, IA site, a levee breach that occurred in June resulted in significant flooding of the treated fields. Substantial portions of the Dana, IA corn field were completely submerged for several days, possibly complicating the interpretation of results from this site.

TABLE 6

| PPFM Application rates (average) | | | |
|---|---|---|---|
| Strain | Treatment | Dana, IA | Whitewater, WI |
| NLS020 | In furrow | $3.8 \times 10^9$ CFU/mL | $3.8 \times 10^9$ CFU/mL |
| NLS042 | In furrow | $8.1 \times 10^8$ CFU/mL | $8.1 \times 10^8$ CFU/mL |
| NLS020 | Foliar Spray | $2.8 \times 10^9$ CFU/mL | $1.1 \times 10^9$ CFU/mL |
| NLS042 | Foliar Spray | $8.4 \times 10^8$ CFU/mL | $8.7 \times 10^8$ CFU/mL |

Results

At the Whitewater site, NLS0042 applied as an in-furrow application gave the greatest improvement in early stand and vigor, improved late stand, and increased stem diameter/internode length (Table 7). NLS0042 foliar application improved late vigor and internode length at the Whitewater site (Table 7).

TABLE 7

| | | | | | | | |
|---|---|---|---|---|---|---|---|
| Whitewater growth data sets | | | | | | | |
| Treatment | Application Rate (PPFM Titer) | Early Stand | Early Vigor | Late Stand | Late Vigor | Stalk Diameter Inches | Internode Length Inches |
| Untreated check - in-furrow (H₂O) | Water Only (0 CFU/mL) | 30.9a | 3.0a | 31.0a | 3.0a | 0.28a | 4.85a |
| Untreated check - Foliar (H2O) | Water Only (0 CFU/mL) | 30.9a | 3.0a | 31.0a | 3.0a | 0.27a | 4.88ab |
| NLS0020 in-furrow | 1.25 L/Acre ($3.8 \times 10^9$ CFU/mL) | 31.2b | 3.5b | 31.2b | 3.5b | 0.34b | 4.94bc |
| NLS0042 in-furrow | 1.25 L/Acre ($8.1 \times 10^8$ CFU/mL) | 31.3b | 3.8c | 31.4b | 3.7b | 0.35c | 5.02d |
| NLS0020 foliar | 5 L/Acre ($3.8 \times 10^9$ CFU/mL) | 30.9a | 3.0a | 31.0a | 3.5b | 0.28a | 4.90ab |
| NLS0042 foliar | 5 L/acre ($8.1 \times 10^8$ CFU/mL) | 30.9a | 3.0a | 31.0a | 3.8b | 0.28a | 5.00cd |

Means followed by the same letter are not significantly different, LSD at P = 0.05.

Analysis of the corn root architecture at V3 corn plants from the Whitewater site using WinRhizo™ indicated a reduction in early root damage following in-furrow application of NLS0020 and NLS0042 when compared to the untreated water check (Table 8).

TABLE 8

| Whitewater Root Architecture data | | | | | | | | | | |
|---|---|---|---|---|---|---|---|---|---|---|
| Treatment | Root Average Diameter (mm) | | Root Length (cm) | | Root Projected Area (cm2) | | Root Surface Area (cm2) | | Root Volume (cm3) | |
| Water Check at 1.25 L/Acre | 1.304 | AB | 131.179 | B | 16.804 | B | 52.791 | B | 1.719 | B |
| NLS0020 In furrow at 1.25 L/acre | 1.327 | A | 141.592 | AB | 18.441 | A | 57.934 | A | 1.918 | A |
| NLS0042 in-furrow at 1.25 L/acre | 1.251 | B | 145.257 | A | 17.729 | AB | 55.698 | AB | 1.74 | B |

Means followed by the same letter are not significantly different at $\alpha = 0.20$.

Figure 3:
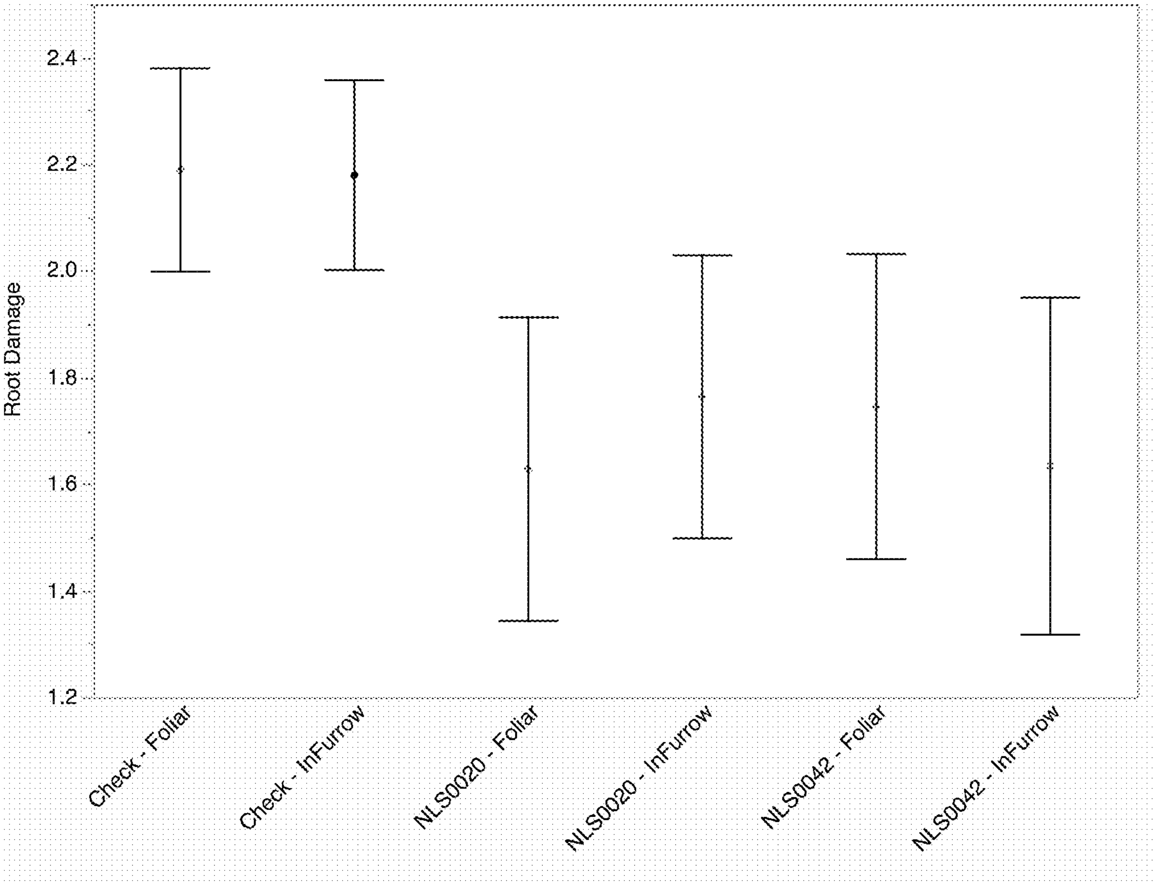
FIG. 3. Mean root damage of Whitewater and Dana inoculation treatments with standard error.

The variable "Root Damage" was measured at the site in Wisconsin ("Whitewater") and the site in Iowa ("Dana"). This variable was intended to index the amount of root damage due to corn rootworm and the potential ability of the two *Methylobacterium* isolates (strains ISO02 [NLS0020] and ISO04 [NLS0042]) to suppress infection when applied as either an in-furrow application at planting ("InFurrow") or foliar application at the V3 stage ("Foliar"). Control applications were also made with water used in place of the bacteria ("Check InFurrow" and "Check Foliar"). The degree of root damage caused by CRW feeding was scored on a scale between 0 and 3, with 3 representing very serious damage. When data from both sites are considered together, it is apparent that all applications of PPFM strains reduced root damage markedly from the levels of the uninoculated Check treatments (FIG. 3), and this difference was found to be significant with a mixed linear model with Tukey's HSD post-hoc test (Table 9).

TABLE 9

Mean root damage of each inoculation treatment. Different letters indicate a significant difference between treatment levels at P < 0.05 using Tukey's HSD post-hoc test.

| Treatment | | | Mean root damage |
|---|---|---|---|
| Check - Foliar | A | | 2.189 |
| Check - In Furrow | A | | 2.179 |
| NLS0020 - In Furrow | | B | 1.763 |
| NLS0042 - Foliar | | B | 1.745 |
| NLS0042 - In Furrow | | B | 1.633 |
| NLS0020 - Foliar | | B | 1.628 |

Figure 4:
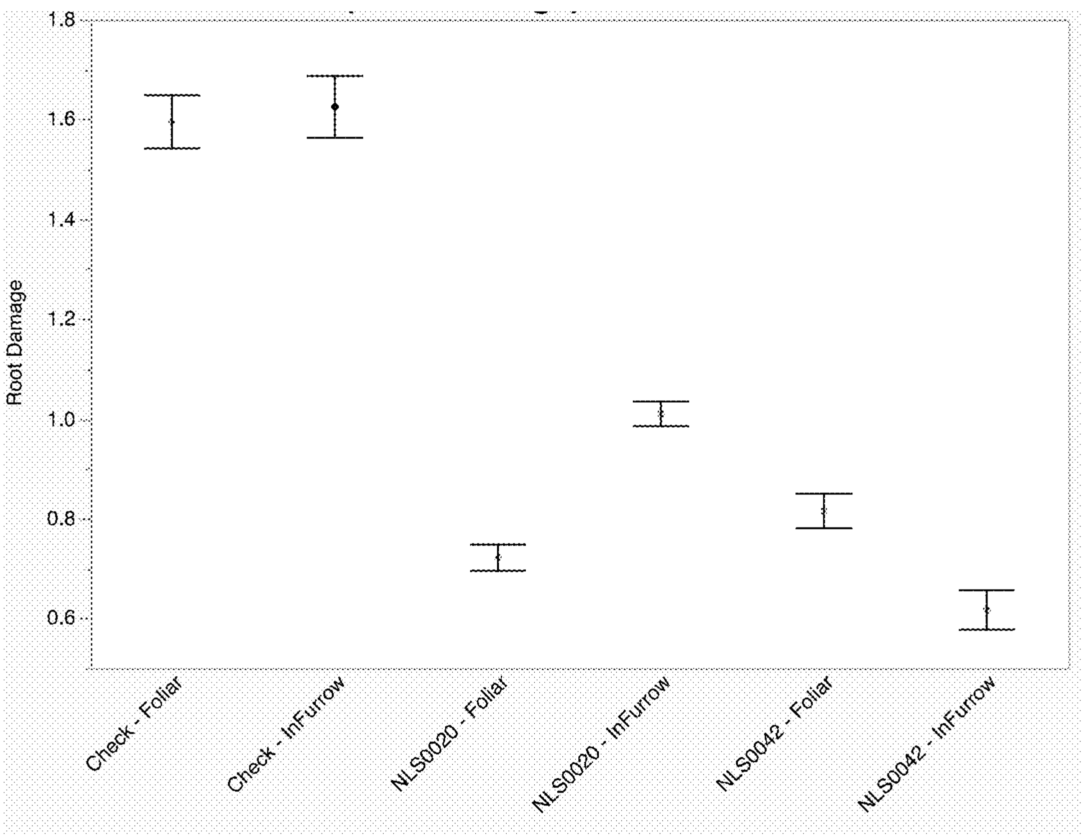
FIG. 4. Mean root damage of inoculation treatments with standard error at Whitewater (Wis.).
Figure 5:
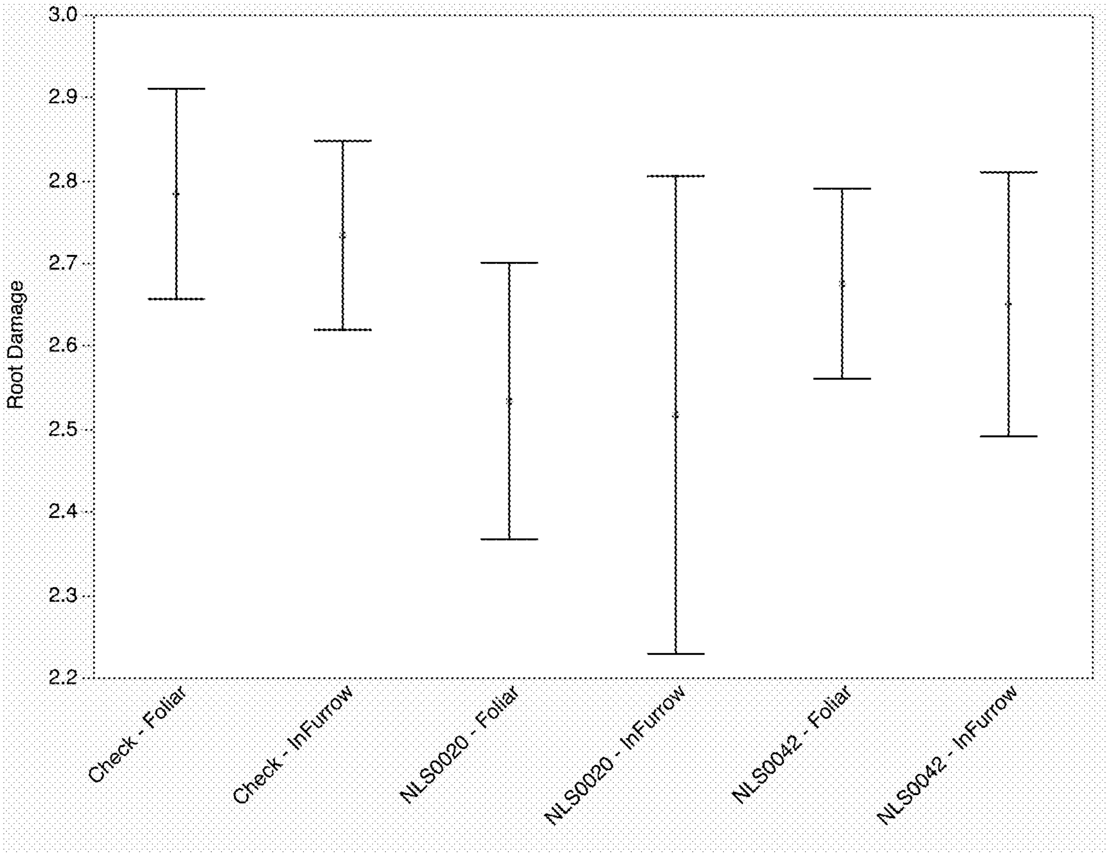
FIG. 5. Mean root damage of inoculation treatments with standard error at Dana (IA).

When the two sites are regarded separately, it is clear that the significant reduction in root damage due to PPFM inoculation was mainly driven by results at Whitewater, WI (FIG. 3) rather than Dana, IA (FIG. 4). The differences between treatment groups were even more pronounced at Whitewater than in the overall dataset (Table 10), while at Dana, IA there were no significant differences between groups (Table 11), though damage was numerically greater in the uninoculated Check treatments than in any of the inoculated treatments. Tukey's 1-degree of freedom test of nonadditivity was used as well for the results at Whitewater to determine whether certain plots may be driving the observed trends, but the result suggests that plots did not significantly differ in their influence on the result (P=0.33) and that the suppression of root damage by the PPFM strains was consistent across plots at Whitewater.

Mean root damage of each inoculation treatment at Whitewater (Wis.). Different letters indicate a significant difference between treatment levels at P<0.05 using Tukey's HSD post-hoc test.

TABLE 10

Mean root damage of each inoculation treatment at Whitewater (WI). Different letters indicate a significant difference between treatment levels at P < 0.05 using Tukey's HSD post-hoc test.

| Treatment | | | | | Mean root damage |
|---|---|---|---|---|---|
| Check - InFurrow | A | | | | 1.625 |
| Check - Foliar | A | | | | 1.595 |
| NLS0020 - InFurrow | | B | | | 1.010 |
| NLS0042 - Foliar | | | C | | 0.8150 |
| NLS0020 - Foliar | | | C | D | 0.7217 |
| NLS0042 - InFurrow | | | | D | 0.6167 |

TABLE 11

Mean root damage of each inoculation treatment at Dana, IA (IA). Different letters indicate a significant difference between treatment levels at P < 0.05 using Tukey's HSD post-hoc test.

| Treatment | | Mean root damage |
|---|---|---|
| Check - Foliar | A | 2.783 |
| Check - InFurrow | A | 2.733 |
| NLS0042 - Foliar | A | 2.675 |
| NLS0042 - InFurrow | A | 2.650 |
| NLS0020 - Foliar | A | 2.533 |
| NLS0020 - InFurrow | A | 2.517 |

Overall, the results support the conclusion that both of the strains and application methods were effective in suppressing root damage due to corn rootworm; root damage was significantly lower in all four inoculated treatments than in uninoculated Check treatments when both sites are analyzed together. While this result is driven mainly by the results at Whitewater, the scores of root damage were highest in the two uninoculated Check groups at Dana, IA as well. Furthermore, Dana, IA experienced considerable early-season flooding while Whitewater did not, and this may have confounded somewhat assessment of suppression of corn rootworm at the Iowa site. Corn rootworm larvae are sensitive to prolonged early-season flooding, and a reduction in their population may interfere with assessment of corn rootworm suppression at this site. Interestingly, overall root damage scores were much higher at Dana, IA than at Whitewater (Tables 10 and 11), suggesting that other factors (e.g. hypoxia) may have caused considerable root damage and further obscured assessment of the effects of PPFMs against corn rootworm.

REFERENCES

1. Miller J R, Koren S, Sutton G (2010) Assembly algorithms for next-generation sequencing data. Genomics 95: 315-327.

2. Zerbino D R, Birney E (2008) Velvet: algorithms for de novo short read assembly using de Bruijn graphs. Genome Res 18: 821-829.
3. Delcher A L, Bratke K A, Powers E C, Salzberg S L (2007) Identifying bacterial genes and endosymbiont DNA with Glimmer. Bioinformatics 23: 673-679.
4. Lowe™, Eddy S R (1997) tRNAscan-SE: a program for improved detection of transfer RNA genes in genomic sequence. Nucleic Acids Res 25: 955-964.
5. Lagesen K, Hallin P, Rodland E A, Staerfeldt H H, Rognes T, et al. (2007) RNAmmer: consistent and rapid annotation of ribosomal RNA genes. Nucleic Acids Res 35: 3100-3108.
6. Cantarel B, Korf I, Robb S, et al. (2008) MAKER: An easy-to-use annotation pipeline designed for emerging model organism genomes. Genome Research 18: 188-196.
7. Altschul S F, Madden T L, Schaffer A A, Zhang J, Zhang Z, et al. (1997) Gapped BLAST and PSI-BLAST: a new generation of protein database search programs. Nucleic Acids Res 25: 3389-3402.
8. Eddy S R (2009) A new generation of homology search tools based on probabilistic inference. Genome Inform 23: 205-211.
9. Haft D H, Selengut J D, White O (2003) The TIGRFAMs database of protein families. Nucleic Acids Res 31: 371-373.
10. Tatusov R L, Fedorova N D, Jackson J D, Jacobs A R, Kiryutin B, et al. (2003) The COG database: an updated version includes eukaryotes. BMC Bioinformatics 4: 41.
11. Suzek B E, Huang H, McGarvey P, Mazumder R, Wu C H (2007) UniRef: comprehensive and non-redundant UniProt reference clusters. Bioinformatics 23: 1282-1288.
12. Li H. and Durbin R. (2009) Fast and accurate short read alignment with Burrows-Wheeler Transform. Bioinformatics, 25:1754-60.
13. Abanda-Nkpwatt, D., M. Musch, J. Tschiersch, M. Boettner, and W. Schwab. 2006. Molecular interaction between *Methylobacterium extorquens* and seedlings: growth promotion, methanol consumption, and localization of the methanol emission site. J. Exp. Bot. 57: 4025-4032.
14. Broekaert W F, Terras F R, Cammue B P, Vanderleyden J (1990) An automated quantitative assay for fungal growth inhibition. FEMS Microbiology Letters 69: 55-60.
15. Cao, Y-R, Wang, Q., Jin, R-X., Tang, S-K., He, W-X., Lai, H-X, Xu, L-H., and C-L Jiang. 2011. *Methylobacterium soli* sp. nov. a methanol-utilizing bacterium isolated from the forest soil. Antonie van Leeuwenhoek (2011) 99:629-634.
16. Corpe, W. A., and D. V. Basile. 1982. Methanol-utilizing bacteria associated with green plants. Devel. Industr. Microbiol. 23: 483-493.
17. Corpe, W. A., and S. Rheem. 1989. Ecology of the methylotrophic bacteria on living leaf surfaces. FEMS Microbiol. Ecol. 62: 243-250.
18. Green, P. N. 2005. *Methylobacterium*. In Brenner, D. J., N. R. Krieg, and J. T. Staley (eds.). "Bergey's Manual of Systematic Bacteriology. Volume two, The Proteobacteria. Part C, The alpha-, beta-, delta-, and epsilonproteobacteria." Second edition. Springer, New York. Pages 567-571.
19. Green, P. N. 2006. *Methylobacterium*. In Dworkin, M., S. Falkow, E. Rosenberg, K.-H. Schleifer, and E. Stackebrandt (eds.). "The Prokaryotes. A Handbook on the Biology of Bacteria. Volume 5. Proteobacteria: Alpha and Beta Subclasses." Third edition. Springer, New York. Pages 257-265.
20. Holland, M. A. 1997. *Methylobacterium* and plants. Recent. Res. Devel. in Plant Physiol. 1: 207-213.
21. Holland, M. A., and J. C. Polacco. 1994. PPFMs and other covert contaminants: Is there more to plant physiology than just plant? Annu. Rev. Plant Physiol. Plant Mol. Biol. 45: 197-209.
22. Kutschera, U. 2007. Plant-associated methylobacteria as co-evolved phytosymbionts. A hypothesis. Plant Signal Behav. 2: 74-78.
23. Lidstrom, M. E. 2006. Aerobic methylotrophic prokaryotes. In Dworkin, M., S. Falkow, E. Rosenberg, K.-H. Schleifer, and E. Stackebrandt (eds.). "The Prokaryotes. A Handbook on the Biology of Bacteria. Volume 2. Ecophysiology and biochemistry." Third edition. Springer, New York. Pages 618-634.
24. Madhaiyan, M., S. Poonguzhali, H. S. Lee, K. Hari, S. P. Sundaram, and T. M. Sa. 2005. Pink-pigmented facultative methylotrophic bacteria accelerate germination, growth and yield of sugarcane clone Co86032 (*Saccharum officinarum* L.) Biol. Fertil. Soils 41: 350-358.
25. Madhaiyan, M., S. Poonguzhali, M. Senthilkumar, S. Seshadri, H. Chung, J. Yang, S. Sundaram, and T. Sa. 2004. Growth promotion and induction of systemic resistance in rice cultivar CO-47 (*Oryza sativa* L.) by *Methylobacterium* spp. Bot. Bull. Acad. Sin. 45: 315-324.
26. Madhaiyan, M., S. Poonguzhali, and T. Sa. 2007. Influence of plant species and environmental conditions on epiphytic and endophytic pink-pigmented facultative methylotrophic bacterial populations associated with field-grown rice cultivars. J Microbiol Biotechnol. 2007 October; 17(10):1645-54.
27. Stanier, R. Y., N. J. Palleroni, and M. Doudoroff. 1966. The aerobic pseudomonads: A taxonomic study. J. Gen. Microbiol. 43: 159-271.
28 Sy, A., Giraud, E., Jourand, P., Garcia, N., Willems, A., De Lajudie, P., Prin, Y., Neyra, M., Gillis, M., Boivin-Masson, C., and Dreyfus, B. 2001. Methylotrophic *Methylobacterium* Bacteria Nodulate and Fix Nitrogen in Symbiosis with Legumes. Jour. Bacteriol. 183(1):214-220.
29. Sy, A., A. C. J. Timmers, C. Knief, and J. A. Vorholt. 2005. Methylotrophic metabolism is advantageous for *Methylobacterium extorquens* during colonization of *Medicago truncatula* under competitive conditions. Appl. Environ. Microbiol. 71: 7245-7252.
30. Vogel, H. J., and D. M. Bonner. 1956. Acetylornithinase of *Escherichia coli*: Partial purification and some properties. J. Biol. Chem. 218: 97-106.
31. Vogel, H. J. 1956. A convenient growth medium for *Neurospora* (Medium N). Microbial Genet Bull 13: 42-43.
32. Whittenbury, R., S. L. Davies, and J. F. Wilkinson. 1970. Enrichment, isolation and some properties of methane-utilizing bacteria. J. Gen. Microbiol. 61: 205-218.
33. Bankevich A, Nurk S, Antipov D, Gurevich A A, Dvorkin M, Kulikov A S, Lesin V M, Nikolenko S I, Pham S, Prjibelski A D, Pyshkin A V, Sirotkin A V, Vyahhi N, Tesler G, Alekseyev M A, Pevzner P A. SPAdes: a new genome assembly algorithm and its applications to single-cell sequencing. J Comput Biol. 2012 May; 19(5):455-77. doi: 10.1089/cmb.2012.0021. Epub 2012 Apr. 16. PMID: 22506599.

Having illustrated and described the principles of the present disclosure, it should be apparent to persons skilled in the art that the disclosure can be modified in arrangement and detail without departing from such principles.

Although the materials and methods of this disclosure have been described in terms of various embodiments and illustrative examples, it will be apparent to those of skill in the art that variations can be applied to the materials and methods described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A method for treating a corn plant or corn seed, the comprising applying a composition comprising at least one *Methylobacterium* selected from the group consisting of NLS0042 deposited as NRRL B-50932, NLS0046 deposited as NRRL B-50929, and NLS0065 deposited as NRRL B-50935 to a corn plant or corn seed, thereby obtaining a treated corn plant or treated corn seed, wherein said *Methylobacterium* provides for a reduction in CRW damage sustained by a corn plant grown from the treated corn plant or treated corn seed in the presence of the CRW in comparison to CRW damage sustained by a control corn plant grown from an untreated plant or untreated seed in the presence of CRW.

2. The method of claim 1, wherein the composition comprises a solid substance with adherent CRW-active *Methylobacterium* grown thereon or an emulsion having CRW-active *Methylobacterium* grown therein.

3. The method of claim 1, wherein the CRW-active *Methylobacterium* is NLS0042 deposited as NRRL B-50932.

4. The method of claim 1, wherein the applied composition coats or partially coats the corn seed.

5. The method of claim 1, wherein the reduction in CRW damage is a reduction in lodging and or corn yield.

6. The method of claim 1, wherein said composition comprises said *Methylobacterium* at a titer of at least about $5\times10^6$ colony forming units per milliliter or at least about $5\times10^6$ colony forming units per gram.

7. The method of claim 6, wherein said composition comprises said *Methylobacterium* at a titer of $5\times10^8$ colony forming units per milliliter to $3\times10^{10}$ colony forming units per milliliter.

8. The method of claim 6, wherein said composition comprises said *Methylobacterium* at a titer of $5\times10^8$ colony forming units per gram to $6\times10^{10}$ colony forming units per gram.

9. The method of claim 1, wherein said composition is an essentially dry product having about 5% or less water content.

10. The method of claim 1, wherein said composition is essentially free of contaminating microorganisms.

11. The method of claim 1, wherein said composition further comprises an agriculturally acceptable adjuvant, excipient, or combination thereof.

12. The method of claim 11, wherein said agriculturally excipient comprises a clay or inorganic solid selected from the group consisting of calcium bentonite, kaolin, china clay, talc, perlite, mica, vermiculite, silicas, quartz powder, montmorillonite and mixtures thereof.

13. The method of claim 11, wherein said agriculturally acceptable adjuvant comprises a wetter/spreader, a sticker, a penetrant, an extender, or a humectant that enhances product efficacy or ease of product application.

14. The method of claim 1, wherein the composition is applied to the corn seed in furrow.

15. The method of claim 14, wherein the composition is applied by depositing the composition in furrow at the same time as placing the corn seed in the furrow, or after placing the corn seed in the furrow.

16. The method of claim 1, wherein said composition further comprises an insecticide that provides for inhibition of CRW growth and/or reductions in CRW-mediated plant damage.

17. The method of claim 1, wherein said composition further comprises a pesticide.

18. The method of claim 1, wherein said composition further comprises a population of one or more plant beneficial microorganisms other than *Methylobacterium*.

19. A treated corn seed obtained by the method of claim 1, wherein said *Methylobacterium* is NLS0046 deposited as NRRL B-50929 or NLS0065 deposited as NRRL B-50935.

* * * * *